United States Patent
Bowman et al.

(10) Patent No.: US 11,592,393 B2
(45) Date of Patent: Feb. 28, 2023

(54) WIDE-FIELD NANOSECOND IMAGING METHODS USING WIDE-FIELD OPTICAL MODULATORS

(71) Applicant: The Board of Trustees of the Leland Stanford Junior University, Stanford, CA (US)

(72) Inventors: Adam Bowman, Stanford, CA (US); Mark A. Kasevich, Palo Alto, CA (US); Brannon Klopfer, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 17/290,953

(22) PCT Filed: Nov. 21, 2019

(86) PCT No.: PCT/US2019/062640
§ 371 (c)(1),
(2) Date: May 3, 2021

(87) PCT Pub. No.: WO2020/106972
PCT Pub. Date: May 28, 2020

(65) Prior Publication Data
US 2021/0389244 A1 Dec. 16, 2021

Related U.S. Application Data

(60) Provisional application No. 62/770,533, filed on Nov. 21, 2018.

(51) Int. Cl.
*G01N 21/64* (2006.01)

(52) U.S. Cl.
CPC ..... *G01N 21/6408* (2013.01); *G01N 21/6458* (2013.01)

(58) Field of Classification Search
CPC ............ G01N 21/6408; G01N 21/6458; G01S 17/894; G01S 7/4816; G01S 7/4865
See application file for complete search history.

(56) References Cited

U.S. PATENT DOCUMENTS

| | | |
|---|---|---|
| 4,270,847 A | 6/1981 | Meyer |
| 4,877,965 A | 10/1989 | Dandliker |
| 6,455,861 B1 | 9/2002 | Hoyt |
| 6,741,346 B1 | 5/2004 | Gerstner |

(Continued)

FOREIGN PATENT DOCUMENTS

WO   WO2015164868   10/2015

OTHER PUBLICATIONS

Elson et al., "Time-domain fluorescence lifetime imaging applied to biological tissue", 2004, Photochem Photobiol Sci 3(8):795-801.

*Primary Examiner* — David P Porta
*Assistant Examiner* — Djura Malevic
(74) *Attorney, Agent, or Firm* — Lumen Patent Firm

(57) ABSTRACT

Improved resolution of a time-varying optical image is provided with a wide field optical intensity modulator having a bandwidth greater than that of the detector array(s). The modulator configuration can have high photon collection efficiency, e.g. by using polarization modulation to split the incident light into several timegated channels.

15 Claims, 15 Drawing Sheets

(56) References Cited

U.S. PATENT DOCUMENTS

| | | | |
|---|---|---|---|
| 7,508,505 B2 | 3/2009 | Lustenberger | |
| 7,663,752 B2* | 2/2010 | Otsuki | G01N 21/211 |
| | | | 250/225 |
| 8,314,405 B2 | 11/2012 | Kim | |
| 9,360,660 B2* | 6/2016 | Yi | G01N 21/64 |
| 9,372,334 B2 | 6/2016 | Seyfried | |
| 10,218,962 B2 | 2/2019 | Banks | |
| 10,228,287 B2* | 3/2019 | Shen | G01J 3/18 |
| 10,437,082 B2 | 10/2019 | Banks | |
| 10,785,456 B1* | 9/2020 | Schroeder | H04N 5/232 |
| 10,884,227 B2* | 1/2021 | Tomer | G02B 21/367 |
| 11,270,127 B1* | 3/2022 | Kirch | G01S 17/42 |
| 2001/0019325 A1 | 9/2001 | Takekawa | |
| 2003/0058442 A1* | 3/2003 | Garab | G01N 21/21 |
| | | | 356/369 |
| 2004/0233944 A1* | 11/2004 | Dantus | G01B 9/02014 |
| | | | 372/25 |
| 2005/0134849 A1* | 6/2005 | Beaglehole | G01N 21/211 |
| | | | 356/369 |
| 2006/0056468 A1* | 3/2006 | Dantus | G01B 9/02014 |
| | | | 372/28 |
| 2006/0187974 A1* | 8/2006 | Dantus | H01J 49/164 |
| | | | 372/9 |
| 2008/0007729 A1 | 1/2008 | Hagler | |
| 2010/0103417 A1* | 4/2010 | Otani | G01N 21/23 |
| | | | 356/364 |
| 2011/0182529 A1* | 7/2011 | Kempe | G02B 21/0032 |
| | | | 382/274 |
| 2011/0211077 A1* | 9/2011 | Nayar | H04N 5/2355 |
| | | | 348/E5.022 |
| 2011/0260036 A1 | 10/2011 | Baraniuk | |
| 2011/0267688 A1* | 11/2011 | Kleppe | G02B 21/0072 |
| | | | 359/385 |
| 2013/0314717 A1* | 11/2013 | Yi | G01N 21/64 |
| | | | 356/479 |
| 2016/0116397 A1* | 4/2016 | Freudenthal | G01N 21/23 |
| | | | 356/370 |
| 2017/0085867 A1* | 3/2017 | Baran | H04N 13/122 |
| 2017/0248796 A1 | 8/2017 | Banks | |
| 2018/0058934 A1 | 3/2018 | Shen | |
| 2018/0275060 A1 | 9/2018 | Xu | |
| 2019/0109973 A1* | 4/2019 | Riza | G03B 17/17 |
| 2019/0386749 A1* | 12/2019 | Lezec | G02B 1/002 |
| 2020/0025677 A1 | 1/2020 | Prater | |
| 2021/0389244 A1* | 12/2021 | Bowman | G01N 21/6408 |

\* cited by examiner

WIDE-FIELD NANOSECOND IMAGING METHODS USING WIDE-FIELD OPTICAL MODULATORS

FIELD OF THE INVENTION

This invention relates to providing improved time resolution in optical imaging.

BACKGROUND

It is often desired to provide improved time resolution in imaging optical measurements. E.g., in fluorescence spectroscopy, fluorescence lifetime provides valuable information. However, typical fluorescence lifetimes are on the order of nanoseconds, which is much too fast for typical imaging detector arrays. Conventional approaches to this issue tend to require a time-consuming scanning approach using a single-element fast detector to follow the time dependence of the incident light. This need to provide information on time dependence of incident light distinguishes this technology from mere fast shuttering of a scene, as in conventional photography. Accordingly, it would be an advance in the art to provide improved time resolution in imaging optical measurements.

SUMMARY

We have found that a wide field optical intensity modulator can have a bandwidth greater than that of typical optical detector arrays, and can therefore be used to provide improved time resolution in optical imaging. In preferred embodiments, the modulator configuration can have high photon collection efficiency (the only losses being small parasitic losses) and may be compatible with standard, inexpensive camera sensors. This combination of benefits makes it especially beneficial for fluorescence lifetime imaging (FLIM), where signals are typically weak and where high photon throughput and rapid acquisition is desired. However, numerous other applications are also possible, as described in detail below.

DETAILED DESCRIPTION

Figure 1A:
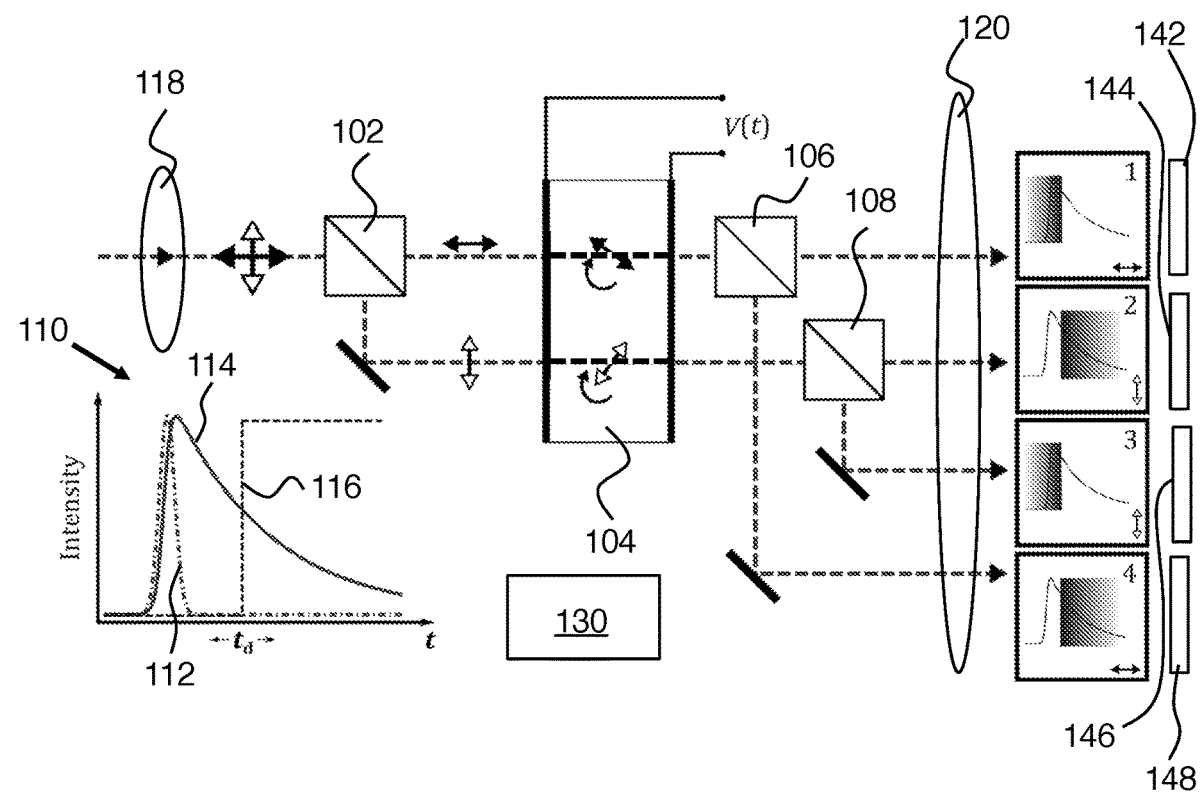
FIG. 1A shows an embodiment of the invention.

Section A of this description describes general principles relating to embodiments of the invention. Section B is a detailed example relating to fluorescence lifetime imaging (FLIM) using Pockels cell modulators. Section C describes several further variations, embodiments and applications. In general, embodiments of the invention are not restricted to the FLIM application of the example of section B, or to the use of Pockels cells as in the example of section B.

A) General Principles

As indicated above, the main idea is to use a wide field optical modulator that is faster than the camera to provide improved resolution of time-varying waveform parameters on a pixel-by-pixel basis.

More specifically, an embodiment of the invention is an apparatus for providing time-resolved optical imaging. The apparatus includes a wide field optical intensity modulator (e.g., combination of 102, 104, 106, 108 on FIG. 1A), one or more 2-D detector arrays (e.g., 142, 144, 146, 148 on FIG. 1A), and imaging optics (e.g., 118, 120 on FIG. 1A) configured to image incident light onto the 2-D detector array(s) through the wide field optical intensity modulator. The temporal bandwidth of the optical modulator is greater than a temporal pixel bandwidth of the 2-D detector array(s). The apparatus further includes a processor (e.g., 130 on FIG. 1A) configured to automatically determine one or more waveform shape parameters of the incident light by analyzing signals from the 2-D detector array(s) vs. an input modulation applied to the optical intensity modulator. Here the one or more waveform shape parameters of the incident light are determined on a pixel-by-pixel basis of the one or more 2-D detector arrays.

Here 'waveform shape parameters' is defined to include three possibilities: 1) curve fitting parameters such as an exponential decay constant of received pulses, 2) data points that provide a discretely sampled estimate of a received waveform pulse shape, and 3) parameters of a periodic received signal, such as phase shift and amplitude modulation, relative to a periodic excitation provided to the scene being imaged. Time delay is not a waveform shape parameter because time delay of a waveform does not result in any change of its shape. Another way to see this distinction is to note that an isolated pulsed waveform (e.g., as used in conventional LIDAR (LIght Detection and Ranging)) does not have a defined phase.

A detector array is a 2-D array of contiguous optical detector elements. In embodiments with multiple detector arrays, these arrays can be integrated on the same substrate or they can be separate devices. 'Wide field' in this work refers to the optical modulator (intensity or polarization) having a sufficiently wide aperture to match the 2-D detector array. In other words, light received at every pixel of the detector array is modulated by a single wide-field optical modulator.

In preferred embodiments, optical intensity modulation is provided by a polarization modulator combined with polarizing optics. Various configurations are possible. A first modulator configuration is where the wide field optical intensity modulator includes a wide field optical polarization modulator disposed between a first polarizer and a second polarizer so as to convert polarization modulation to intensity modulation (example of FIG. 8A).

A second modulator configuration is where the wide field optical intensity modulator includes an input polarizer followed by a wide field optical polarization modulator followed by a polarizing beam splitter. Here the polarizing beam splitter provides a first output to a first of the 2-D detector arrays and provides a second output to a second of the 2-D detector arrays. Here also polarization modulation is converted to intensity modulation of the first and second outputs (example of FIG. 8B).

An example of the use of the second modulator configuration is where the waveform shape parameters include an exponential decay time, and where the input modulation is a step function. Here the exponential decay time can be determined by analysis of single-frame signals from corresponding pixels of the first 2-D detector array and the second 2-D detector array.

A third modulator configuration is as shown on FIG. 1A and described in detail in section B. Here the wide field optical intensity modulator includes:

a) an input polarizing beam splitter (e.g., 102 on FIG. 1A) having a first output and a second output;
b) a wide field optical polarization modulator (PM) (e.g., 104 on FIG. 1A) configured to receive the first and second outputs in parallel and to provide corresponding first and second PM outputs;
c) a first output polarizing beam splitter (e.g., 106 on FIG. 1A) configured to receive the first PM output and to provide a third output and a fourth output (e.g., outputs 1 and 4 on FIG. 1A); and
d) a second output polarizing beam splitter (e.g., 108 on FIG. 1A) configured to receive the second PM output and to provide a fifth output and a sixth output (e.g., outputs 2 and 3 on FIG. 1A).

Here the third output is provided to a first of the 2-D detector arrays (e.g., 142 on FIG. 1A); the fourth output is provided to a second of the 2-D detector arrays (e.g., 148 on FIG. 1A); the fifth output is provided to a third of the 2-D detector arrays (e.g., 144 on FIG. 1A); and the sixth output is provided to a fourth of the 2-D detector arrays (e.g., 146 on FIG. 1A).

A polarizing element or beamsplitter in any of these modulator configurations may take many forms. These include plate polarizers, thin film polarizers, wire-grids, beam-splitting cubes, and polarizing prisms. Some of these may have an in-line configuration such as birefringent beam-displacers, Rochon, or Wollaston prisms. A polarization conversion system may be used to convert unpolarized light to a defined polarization with minimal optical loss while preserving an image. Such a system would be especially suited as a first polarizing element to increase photon efficiency in cases where there only a single beam is modulated. A final possibility includes having spatially separated regions of an array detector each with a different polarizing element in front of the sensor. Similarly, each pixel of the array detector may have its own polarizing element. Such an integrated configuration as found in polarization camera sensors removes the need for image registration of beamsplitter outputs.

The input modulation can be a pulse having an automatically adjustable time delay td after an optical excitation provided to a scene. Here the one or more waveform shape parameters can include data points of detector array signals vs. time delay.

The input modulation can be selected from the group consisting of: a step function, a sampling pulse, and periodic modulation for lock-in detection.

The wide field optical intensity modulator can include a longitudinal Pockels cell having a direction of optical propagation and an applied electric field direction that coincide. Such longitudinal modulators use potassium dideuterium phosphate ($KD_2PO_4$-DKDP) or potassium dihydrogen phosphate (KDP) crystals. This configuration tends to be more appropriate for many applications than a transverse Pockels cell configuration. Optical intensity modulators may also include standard transverse electric field Pockels cell configurations having large aperture. These may be ideal for systems requiring a resonant high voltage drive or larger acceptance angle. Standard commercially available transverse modulators involve two crystals rotated by 90 degrees or separated by a half-wave plate in such a way as to cancel off-axis birefringence effects. This improves their imaging performance and also thermal stability. Such dual modulators are available with apertures greater than 10 mm in standard materials including rubidium titanyl phosphate ($RbTiOPO_4$) and lithium tantalate ($LiTaO_3$).

The imaging optics can include a multi-pass optical cavity having a cavity round trip time, where the multi-pass optical cavity is configured to provide optical time resolution according to multiples of the cavity round trip time (example of FIGS. 5A-D). The modulator in this case may be either internal or external to the multi-pass imaging optics.

The incident light can be a periodic signal that is responsive to a periodic excitation of a scene being viewed. Here the wide field optical intensity modulator is preferably resonantly driven synchronously with respect to the periodic signal (example of FIGS. 10A-B).

Here a modulator is driven synchronously with respect to a periodic signal in the incident light if the modulation frequency is the same as the frequency of the incident light (homodyne). For the homodyne case, the modulation frequency is phase locked (or otherwise held in a constant phase relationship) with respect to the frequency of the incident light. The heterodyne case is also of interest.

The optical intensity modulator can include two or more optical modulators having identical or different input modulation signals.

The imaging optics is typically configured to view a scene. Here a 'scene' being viewed is any combination of one or more objects as viewed through an optical imaging system of any kind (e.g., microscope, endoscope, telescope, etc.). Excitation of such a scene can be provided by various excitation methods (optical, electrical, magnetic, etc.). In this work, the main signal of interest is optical radiation from the scene in response to the excitation. In many cases, this optical radiation from the scene is a nonlinear response of the scene to the excitation. More specifically, such a nonlinear response has frequency components in the response that are not present in the excitation, e.g. as in optical fluorescence. Equivalently, for optical excitation, such a nonlinear response has wavelength components in the response that are not present in the excitation.

An optical response of the scene to an excitation can provide the incident light. In many cases of interest, the optical response of the scene is a nonlinear response. The optical response may also result in a change of the shape of the incident light waveform compared to the illumination waveform. The wide-field optical intensity modulator can be driven with a modulation signal having a controllable delay after the excitation.

In cases where output polarizing beam splitters are used, the outputs are complementary. E.g., if one output is modulated according to an applied modulation signal G(t) the other output is modulated according to 1-G(t).

B) Experimental Demonstration
B1) Introduction

Existing sensors for wide-field nanosecond imaging sacrifice performance to gain temporal resolution, failing to compete with scientific CMOS and electron-multiplying CCD sensors in low-signal applications. A variety of detectors currently access the nanosecond regime. Gated optical intensifiers (GOIs) based on microchannel plates (MCPs) allow for sub-nanosecond gating in a single image frame, and segmented GOIs can acquire multiple frames when combined with image splitting. Gating into n frames in this way limits overall collection efficiency to <1/n, and performance is further limited by photocathode quantum efficiency, MCP pixel density, excess noise, and lateral electron drift. Streak camera techniques have also been demonstrated for widefield imaging, but they also require a photocathode conversion step and additional high-loss encoding. Single-photon avalanche detector (SPAD) arrays are an emerging solid-state approach, but they are currently limited to sparse fill factors and high dark currents.

The limitations of current nanosecond imaging techniques are particularly manifest in fluorescence lifetime imaging microscopy (FLIM). Fluorescence lifetime is a sensitive probe of local fluorophore environment and can be used to report factors like pH, polarity, ion concentration, Förster resonance energy transfer (FRET), and viscosity. As lifetime imaging is insensitive to excitation intensity noise, labelling density, and sample photobleaching, it is attractive for many applications. FLIM typically relies on confocal scanning combined with time-correlated single photon counting (TC-SPC) detectors. The throughput of TC-SPC is limited by the detector's maximum count rate (typically 1-100 MHz), and confocal microscopy relies on high excitation intensities that can cause non-linear photodamage to biological samples. Frequency domain wide-field approaches are a promising alternative, but they currently require demodulation with either a GOI or high-noise modulated camera chip. Given the disadvantages of existing wide-field and TC-SPC approaches, FLIM especially calls for the development of new, efficient imaging strategies to extend its utility for bio-imaging.

Here we demonstrate ultrafast imaging techniques—compatible with standard cameras—that can have no inherent loss or dead time, allowing access to subframe rate sample dynamics at timescales as fast as nanosecond fluorescent lifetimes. First, we show an all-photon wide-field imaging system based on polarizing beam-splitters (PBS) and a Pockels cell (PC). This can be used to create two temporal bins or to modulate images on any timescale—from nanoseconds to milliseconds. We use this to demonstrate efficient wide-field FLIM of a multi-labelled sample, single molecules, and a biological benchmark. Second, we demonstrate the use of a re-imaging optical cavity as a time-to-space converter to enable n-frame ultrafast imaging when combined with a Pockels cell gate.

B2) Results
B2a) Gating with Two Temporal Bins

Figure 1B:
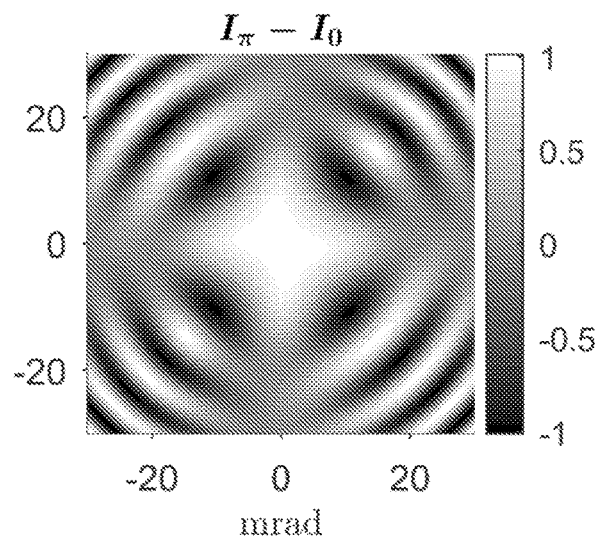
FIG. 1B shows calculated gating efficiency for an exemplary modulator.

FIGS. 1A-B show wide-field efficient ultrafast imaging with a Pockels cell. FIG. 1A is a schematic of two temporal bin wide-field imaging for a single pixel fluorescence decay. Fluorescence emission is first polarized by PBS 102, a time dependent retardance (step function illustrated) is applied by the PC 104, and polarizations are split again before the sensor by PBS 106 and PBS 108. Two pairs of outputs correspond to integrated intensity before (1, 3) and after (2, 4) a step function gate is applied in the illustration. Outputs 1, 2, 3, 4 are received by detector arrays (or cameras) 142, 144, 146, 148, respectively. Here relevant time dependences are shown in inset 110, where 112 is the excitation, 114 is the fluorescence, and 116 is the modulator signal. The imaging optics is schematically shown as 118 and 120. The processor as described above is referenced as 130. For convenience, the imaging optics and processor are not shown on subsequent figures, although they are generally present. Connections between processor 130 and other parts of the system are also not shown. Practice of the invention does not depend critically on the imaging optics, and any known imaging configuration can be employed (e.g., microscope, telescope, endoscope, etc.). Equal optical path lengths are used in practice, and these paths may incorporate standard imaging optics such as beam-expanders, mirrors, and relay optics. FIG. 1B shows gating efficiency ($I_N$–$I_0$) calculated for a 30 mm KD*P Pockels cell as a function of incident angle from conoscopic interference patterns, demonstrating high efficiency gating for wide-field imaging within 6 mrad half-acceptance angle.

Light from an imaging system is polarized with a beamsplitter, and the image associated with each polarization is aligned to propagate through different locations in a wide-aperture PC, as shown in FIG. 1A. The PC provides an electric field-dependent retardance between the input light's polarization components, mapping the temporal signature of the applied field onto the polarization state of the imaging beams. A second PBS after the PC again splits the separated imaging beams, giving four image frames on the camera. The resulting images now encode temporal information, as shown in FIG. 1A. To illustrate our method, we consider a step function voltage pulse applied at delay time $t_d$ with respect to a short (~ns) excitation pulse. The step function with edge at td creates pairs of output images corresponding to integrated signal before and after td. All photons, both before and after the gate, may be collected in a single camera exposure.

In practice, we implement this configuration with either a Gaussian gating pulse at td or a step gate with few nanosecond rise time as described in the following examples. In fact, arbitrary V(t) may be applied to the PC for specific applications (see Discussion). Note that a gating pulse can be applied either as a single shot measurement or over repeated events integrated in one camera frame. Fluorescence lifetime may be recovered by either varying the gate delay $t_d$ to directly measure the fluorescence decay (see multilabel FLIM below) or by single-frame ratios of gated and ungated channel intensities (see single-molecule FLIM below). In cases where the PC aperture is limited, two separate PC crystals may be used instead of using different areas of the same crystal. Separate gates can be applied to each PC to create four time bins as shown, for example, in FIG. 8C.

B2b) Imaging Through Pockels Cells

An important aspect of this technique was realizing that Pockels cells may be ideally suited to wide-field imaging. For decades, Pockels cells have been ubiquitous in applications like pulse-picking, Q-switching, and phase modulation. However, the most common Pockels cells configurations in use are not suited to wide-field imaging. Specifically, they typically have either a small aperture for transverse field modulators or a narrow acceptance angle of a few milliradian for longitudinal modulators. This severely restricts either field-of-view or numerical aperture in imaging applications.

For example, standard PCs often use thick (30-50 mm) potassium dideuterium phosphate (KD*P) crystals with longitudinal field. These give high extinction ratios and are ubiquitous for Q-switching and phase modulation applications. Off-axis rays experience different birefringent phase shifts than those on-axis, limiting the numerical aperture (NA) of the crystal for wide-field imaging. In an image plane, the PC half angular acceptance a limits the NA of collection optics to M$\alpha$ for small angles, where M is magnification. In a diffraction plane (or infinity corrected space), the field of view (FOV) is instead limited to 2 tan($\alpha$)$f_{obj}$ where $f_{obj}$ is the imaging objective focal length. For example, a 10 µm FOV may be achieved with a 1.4 NA microscope objective ($f_{obj}$=1.8 mm) and 40 mm thick longitudinal KD*P PC crystal in the infinity space ($\alpha$~4 mrad). FOV can be further improved by magnifying the beam until the PC aperture becomes limiting. Conventional KD*P PCs are limited to long pulse repetition rates in the 10's of kHz by piezoelectric resonances. We note that ultimate repetition rate depends on high voltage pulse shape and crystal dimensions. Electro-optic pulse pickers can operate to 100 kHz and even into MHz rates with low-piezo materials. Further, periodic drive avoids exciting piezoelectric resonances and is compatible with frequency-domain FLIM at high excitation rates.

To assess gating efficiency, the impact of off-axis birefringence was simulated using Mueller matrices and the index ellipsoid of the crystal to arrive at a conoscopic interference (isogyre) pattern, as viewed through crossed polarizers. Subtracting the transmitted intensity pattern I at zero voltage ($V_0$) from that at the half-wave voltage ($V_\pi$) gives the gating efficiency ($I_\pi$–$I_0$), where the useful NA of the PC is set by the region of high gating efficiency at lower angles (FIG. 1B). The PC is treated as a linear homogeneous retarder with off-axis retardance determined by a coordinate transformation of the crystal axes. We performed this analysis to identify ideal configurations of standard Pockels cells for wide-field imaging. In longitudinal crystals, angular acceptance may be improved by making the crystal thinner, with a 3 mm crystal increasing $\alpha$ to ~20 mrad, effectively removing NA and FOV restrictions for microscopy. Here we show results using a thick 40 mm commercial PC (FIGS. 2A-C and 3A-C) and a custom 3 mm KD*P PC (FIGS. 4A-C). Further, complete zero-field cancellation of off-axis birefringence may be obtained by combining the negative uniaxial ($n_e$<$n_o$) KD*P crystal with a positive uniaxial ($n_e$>$n_o$) static compensating crystal (e.g. MgF$_2$ or YVO$_4$). Such a crystal fully compensates for off-axis rays at $V_0$ and further improves the NA at $V_\pi$ (KD*P becomes biaxial with applied field, preventing full high voltage compensation). This strategy is especially promising for thin KD*P crystals being used as a gate inside of a multi-pass optical cavity where the PC remains off for many passes of the crystal.

We have found that Pockels cells may have even larger acceptance angles by using industry standard dual-crystal compensated, transverse field designs. Here off-axis birefringence and thermal effects can be removed by having two transverse electro-optic modulators either rotated 90 degrees relative to each other or having a half-wave plate between them. This effectively exchanges the ordinary and extraordinary rays while also switching the electric field direction, cancelling off-axis birefringence effects and thermal birefringence effects. Such dual-crystal modulators are known to provide large acceptance angles. In fact, theoretically perfect off-axis cancellation for imaging applications may occur in modulator units where the optical axis of the electro-optic crystals and their propagation axis are perpendicular. Typical dual-crystal modulators have very small apertures, but they are available commercially with apertures>10 mm in materials like rubidium titanyl phosphate and lithium tantalate, requiring proportionally higher switching voltages.

Thin DKDP crystal modulators are less commonly found, but they may be constructed by combining the thin crystal substrate with suitable conducting and optically transparent electrodes such as glass coated with indium tin oxide or other transparent conductive coatings, conductive transparent films, wire meshes, optical micro-meshes, etc.

Driving electronics for the Pockels cell may include any high voltage waveform generator or amplifier including for example avalanche transistors, MOSFET stacks, high voltage MOSFETS in half or full-bridge configurations, drift step recovery diodes, flyback or resonant transformers, pulse forming networks, or non-linear or saturable transmission lines. For resonant configurations, RF drives may be impedance matched to a resonant tank circuit containing the Pockels cell as an electrical component. Such circuits may contain standard L,R,C elements, impedance matching networks, or also resonant transmission lines or transformers for example. Cooling provisions may be provided to counteract dielectric and/or resistive heating. Dielectric fluids may be used to prevent high-voltage breakdown, match refractive indices, or to provide cooling to the crystal.

B2c) Multi-Label FLIM

Figure 2A:
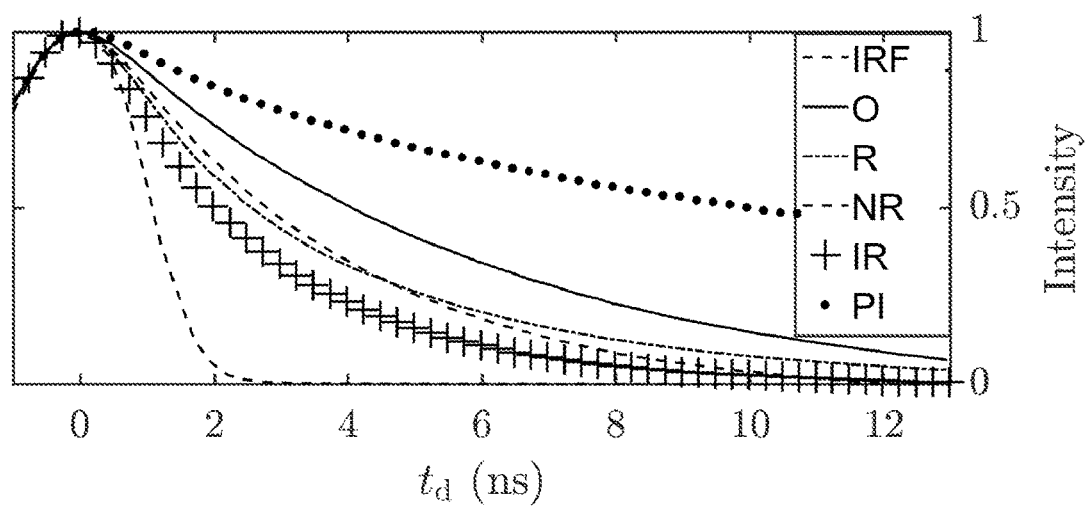
FIGS. 2A-C provide experimental results relating to multi-label FLIM.
Figures 2B, 2C:
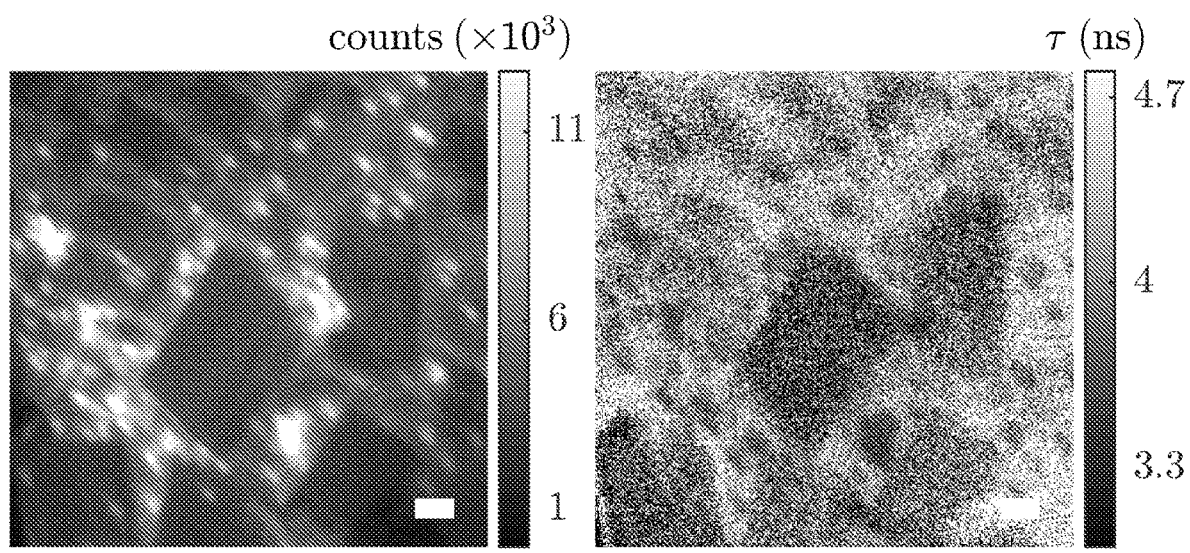

FIGS. 2A-C relate to Multi-label FLIM. FIG. 2A shows direct measurement of fluorescence decays obtained by sweeping gate delay time td for orange (O, 4.9 ns), red (R, 3.4 ns), nile red (NR, ~3.1 ns), infrared (IR, 2.3 ns) and propidium iodide (PI, 14 ns) beads. Fitted decay constants $\tau$ are given. The measured Gaussian instrument response function (IRF) is also plotted. FIG. 2B is an intensity image of a three-label wide-field sample of orange, nile red, and infrared beads (labels strongly overlap spatially). FIG. 2C is a lifetime image that reveals spatial distribution of the labels. Lifetime is measured by fitting the decay traces at each pixel (scale bars 10 µm).

The two bin method has no intrinsic gating loss and allows for imaging onto any sensor. Fluorescence lifetime imaging is thus an ideal demonstration for the technique, where the PC gating pulse is applied after delay td from the fluorescence excitation. Lifetime may then be determined by either varying the delay time td over multiple frames (as used here) or by taking the single-frame ratio of pre- and post-gate intensities (following section). In FIGS. 2A-C we image a mixture of three labels having different lifetimes measured individually to be 3.1 ns (2 µm nile red Invitrogen beads), 4.9 ns (0.1 µm orange Invitrogen beads—background), and 2.3 ns (0.1 µm infrared Invitrogen beads—formed into crystals). For this data, the PC was located in the image plane, allowing for wide-field FLIM of bright samples at 0.1 NA and 20× magnification with 100 micron FOV. The sample is excited by laser pulses with duration 1 ns at 532 nm and 5 kHz repetition rate. The fluorescence signal results from the convolution of the decay function with the laser's Gaussian excitation pulse with FWHM pulse width ~2.4 $\sigma_e$. The commercial PC used in FIGS. 2A-C applies a Gaussian gate function g(t–$t_d$) in our experiment with a pulse width of 2.6 ns. By sweeping the delay time $t_d$, the convolution of the fluorescence with the gating function is measured: f(t,$\tau$,$\sigma_e$)*g(t–$t_d$). Temporal information such as fluorescence lifetime may be calculated by directly fitting the measured convolution. Note that the convolution of excitation and gating functions in this case gives a Gaussian instrument response function (IRF) with $\sigma_{IRF}=\sigma_e^2+\sigma_g^2$, measured directly in FIG. 2A. The fitting approach samples the fluorescence decay at more time points and can be advantageous for brightly labeled samples compared to a two-bin measurement. This could be used to more effectively measure multi-exponential decays for instance.

B2d) Wide-Field FLIM of Single Molecules

Figure 3A:
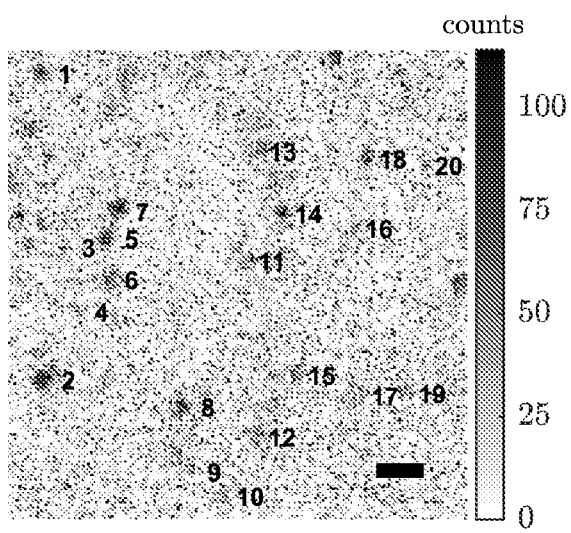
FIGS. 3A-C provide experimental results relating to wide-field FLIM.
Figure 3B:
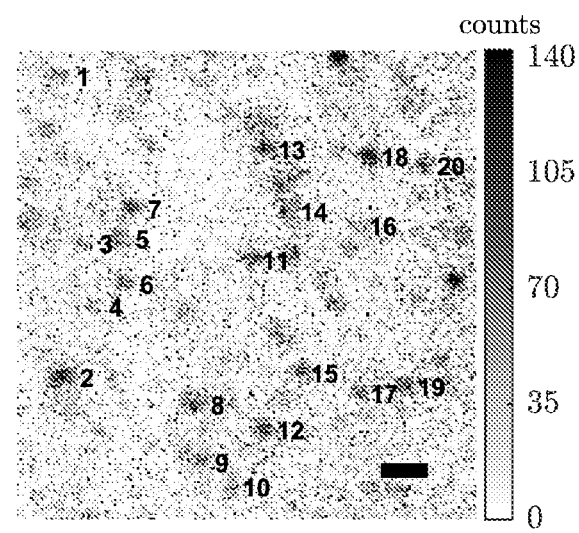
Figure 3C:
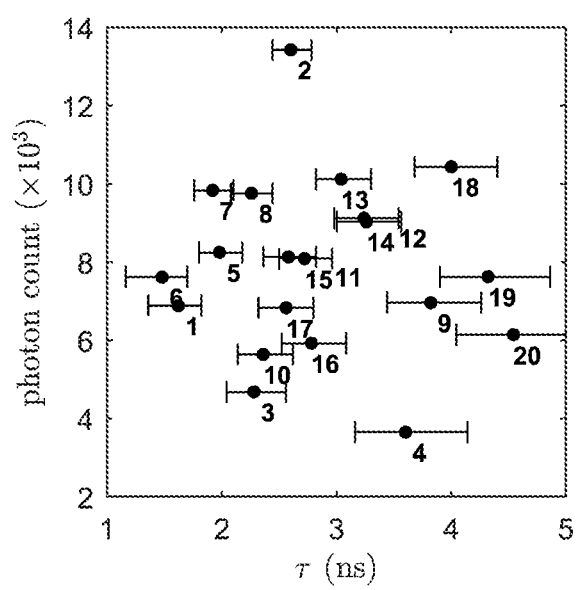
Figure 4A:
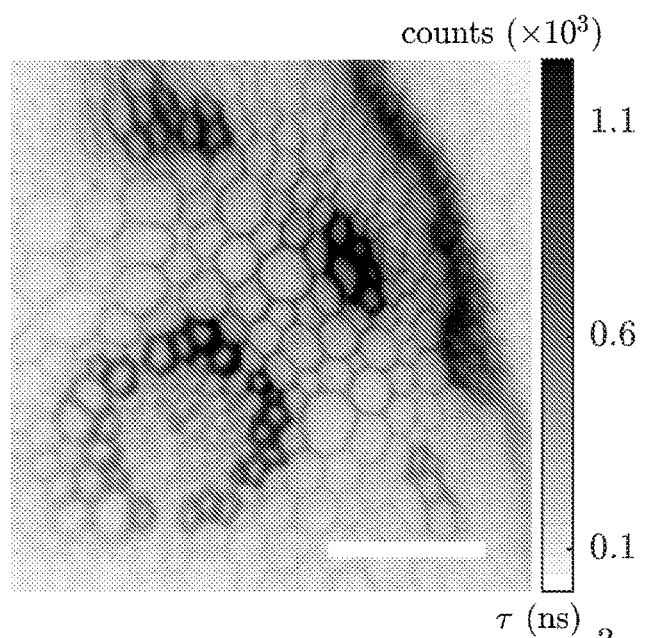
FIGS. 4A-C provide experimental results relating to fast FLIM with a thin Pockels cell modulator.
Figure 4B:
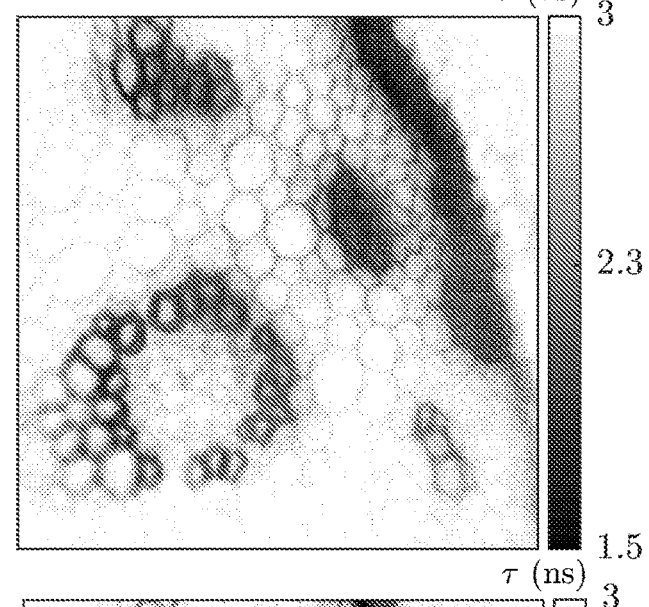
Figure 4C:
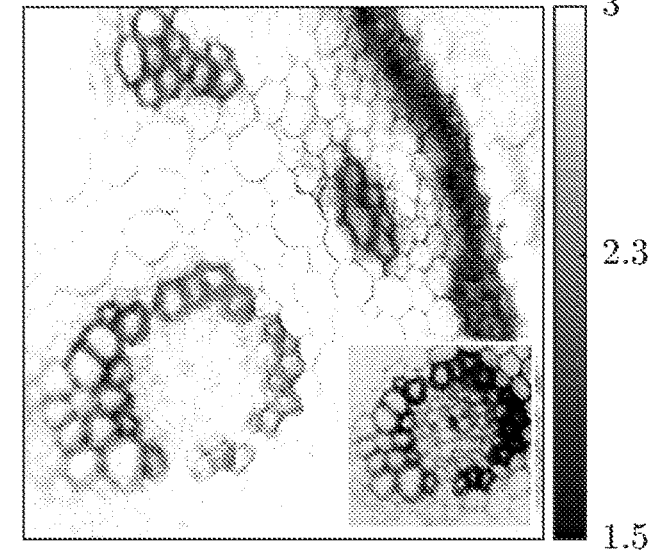

FIGS. 3A-C relate to Wide-field FLIM of Alexa Fluor 532 molecules. FIG. 3A show gated channel intensity. FIG. 3B shows ungated channel intensity (scale bar 1 µm). FIG. 3C shows measured lifetimes plotted along with total brightness for the numbered, diffraction limited regions with SE error bars indicated. The majority of these spots are single-molecule emitters as demonstrated by their photobleaching and blinking dynamics.

For signal-limited applications relying on efficient photon collection or requiring fast acquisition rates, fluorescence lifetime is best determined by the ratio of gated and ungated intensity in a single frame. In FIGS. 3A-C, we demonstrate wide-field lifetime microscopy of Alexa Fluor 532 molecules on glass in a 10×10 µm region. The measured lifetimes are consistent with both the ensemble lifetime of 2.5 ns and the large molecular variation seen in similar studies on glass. The PC is used in the infinity space of the microscope objective to apply the same Gaussian gating function at $t_d$=1.6 ns and 15 kHz repetition rate. The ratio of the gated and ungated intensity is given by $$R = \frac{\int g(t-t_d) f(t, \tau, \sigma_e) dt}{\int f(t, \tau, \sigma_e)[1 - g(t-t_d)] dt} = \frac{g * f}{(1-g) * f}\bigg|_{t=t_d} \quad (1)$$

To calculate lifetime, this ratio is experimentally determined by summing intensity in a region of interest around each molecule. This approach allows single-molecule lifetime spectroscopy while maintaining diffraction limited resolution and efficient photon collection of ~7×10³ photons per molecule (15 s exposure time). FIG. 3C shows the estimated lifetime and total brightness for each numbered diffraction-limited emitter along with error-bars for the lifetime estimation. Estimation is limited by fluorescence background and dark current here. A low-cost industry CMOS machine vision camera (FLIR) is used for the detector. In this case, the angular acceptance of the PC limits the field of view to 10 µm but still allows photon collection at 1.4 NA. Single-molecule lifetime spectroscopy in wide-field remains challenging with confocal approaches, whereas here it is readily demonstrated with PC gating and an inexpensive, high-noise camera.

B2e) Fast FLIM with a Thin PC

FIGS. 4A-C relate to Fast FLIM with a thin PC. FIG. 4A is an intensity image of *Convallaria majalis* rhizome stained with acridine orange, a standard FLIM benchmark (scale bar 100 µm). FIG. 4B is a lifetime image from fitting a timing trace of 100 ms exposures (50 µW excitation). FIG. 4C is a lifetime image from a single 100 ms acquisition frame. The inset (lower right of FIG. 4C) demonstrates the same single frame with 2 ms exposure at high excitation intensity (3 mW—high intensity significantly reduced lifetime in this sample, possibly due to photochemistry). Lifetime images include an intensity mask to show sample structure.

By using a thin PC crystal, these techniques are extended to ultra-wide fields of view. A 3 mm thick KD*P Pockels cell with a 20 mm aperture gates nearly the entire output of a standard inverted microscope with an 0.8 NA objective. A 4.5 ns rising edge pulse was used at 5 kHz repetition rate to image a standard FLIM benchmark in FIGS. 4A-C. Single frame and trace-fitting analysis demonstrate rapid acquisition of megapixel FLIM images with 300 µm square FOV. Single frame exposures of 100 ms and 2 ms are demonstrated—the latter may be taken at the maximum camera frame rate. These acquisitions show dramatic throughput advantage for wide-field acquisition. The 100 ms frame in FIG. 4C is formed from single exposure detection of 4.8× 10⁸ photons by 0.8 megapixels. The inset in FIG. 4C (lower right) likewise corresponds to a 2 ms exposure of the same frame at higher excitation intensity with 3.1×10⁸ detected photons. The number of detected photons is inferred from the known responsivity of the camera. Compared to a 2 MHz TC-SPC photon counting rate (standard to avoid pile-up error), these acquisitions give a 2,400× and 78,000× enhancement in photon throughput respectively. Such high throughput and potential for low exposure times will enable future FLIM studies on dynamic samples. The single-frame acquisition method is particularly powerful, as it prevents image motion artifacts (caused by multiple acquisition frames or scanning for example) and allows self-normalization within a single exposure to remove intensity noise. Quantitative lifetimes are easily calculated using the pre-calibrated IRF as described in the prior sections.

B2f) Gated Re-Imaging Cavities for Multi-Frame Imaging

Figure 5A:
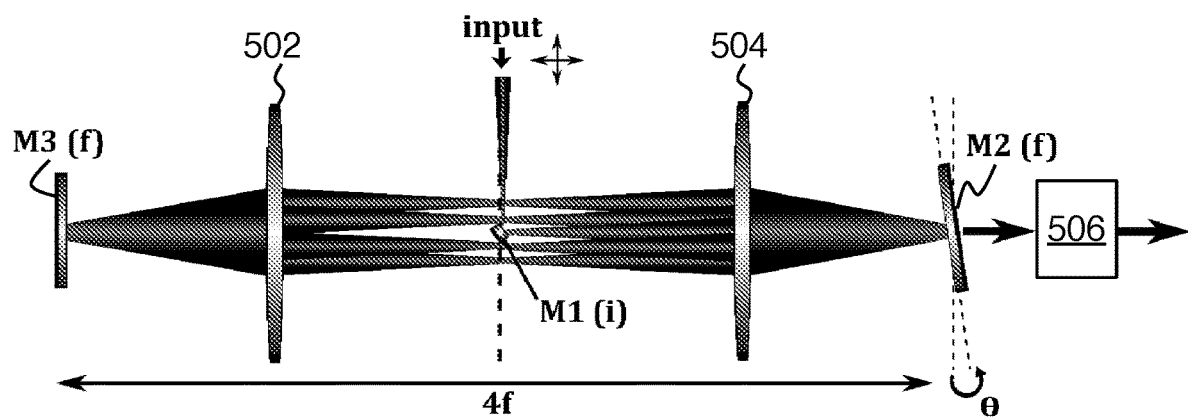
FIGS. 5A-D relate to a multi-pass cavity to provide time binning.
Figure 5B:
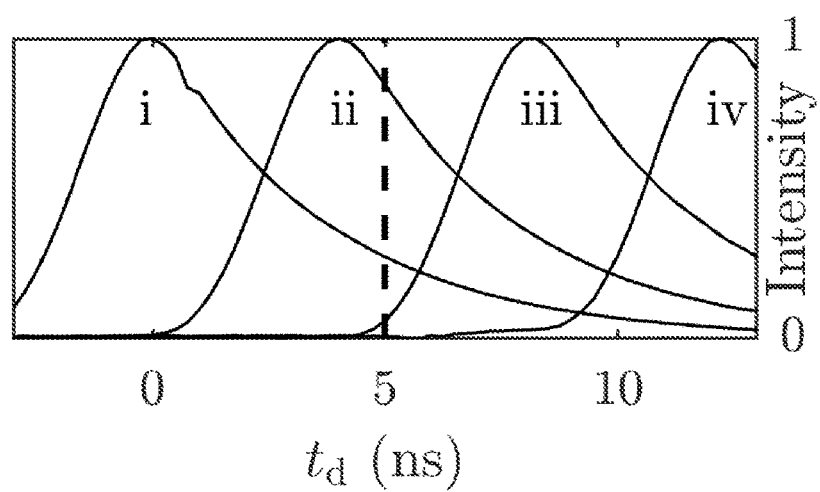
Figure 5C:
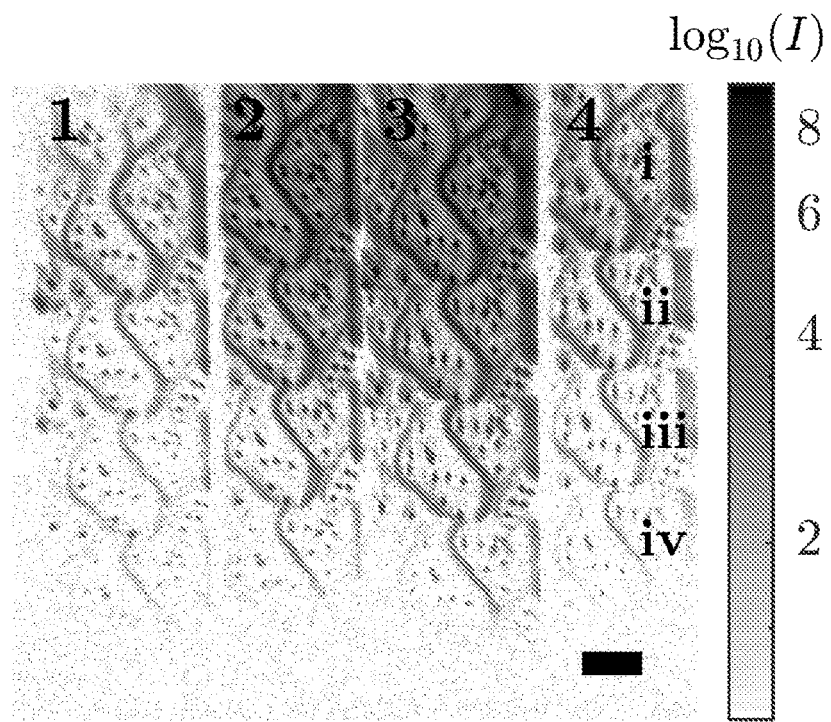
Figure 5D:
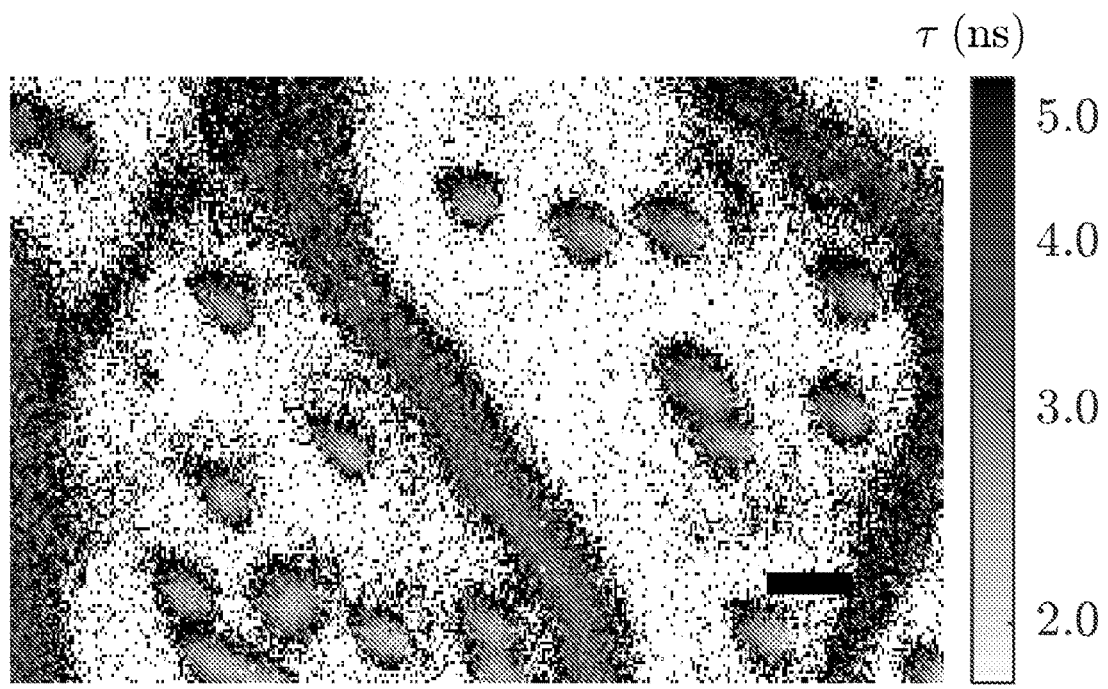

FIGS. 5A-D relate to multi-frame nanosecond imaging with a cavity time-to-space converter. FIG. 5A shows an externally gated, tilted mirror 4f re-imaging cavity. Image input is on small in-coupling mirror M1 in an image plane (i). M2 is tilted at a diffraction plane (f), spatially offsetting the images at the M1 plane each pass. Each round trip, images are passively out-coupled through partially transmissive mirror M2. Here 502 and 504 are the re-imaging lenses for the 4f cavity, and 506 is the PC output gate. FIG. 4B show normalized image intensities for four output images from the cavity showing a 4 ns round trip delay. The cavity output on camera (CMOS camera) images of FIG. 5C show four images output from the PC analyzer for each round trip output from the cavity (columns numbered 1-4 as in FIG. 1A). Four round-trips (rows i-iv) are displayed (scale bar 50 µm). The sample is a mixture of drop-cast nile red 2 µm beads (~3.1 ns) and orange 0.1 µm beads (4.9 ns) that form the diffuse filaments. FIG. 5D shows the ratio of output frames (row i, column 4) and (row ii, column 4) in the gated channel at $t_d$=5 ns (red line in (b)) that is used for single frame FLIM as described below. The two labels are readily differentiated (scale bar 10 µm).

Nanosecond imaging with PCs can be extended beyond two temporal bins through the use of gated re-imaging optical cavities. Larger bin numbers enable increased estimation accuracy for multi-exponential decays, improve lifetime dynamic range, and also allow efficient single-shot ultrafast imaging. We exploit the round-trip optical delay of a re-imaging cavity combined with a tilted cavity mirror to provide nanosecond temporal resolution by spatially separating the cavity round trips. While imaging with n-frames using GOIs is limited to <1/n collection efficiency, this re-imaging cavity technique enables efficient photon collection for low-light or single-photon sensitive applications. In related work, cavities have been used for single channel orbital angular momentum and wavelength to time conversion. Aligned optical cavities have been used for time-folded optical imaging modalities like multi-pass microscopy. Our implementation instead employs a re-imaging cavity as the means to obtain temporal resolution for wide-field imaging.

An image is in-coupled to a 4f cavity at the central focal plane by means of a small mirror M1 as shown in FIG. 5A. The 4f configuration re-images the end mirrors (diffraction planes) every round trip. If one end mirror M2 is tilted by angle θ, the image position $y_i$ at the central focal plane after n round trips is displaced by $y_i = f \sin(2n\theta)$, where f is the focal length of the 4f cavity. The angle $\theta$ is set such that the resulting images are not blocked by the in-coupling mirror. Each sequentially displaced image is delayed in turn by an additional round trip. To extract temporal information, the spatially separated images need to be either gated externally or simultaneously outcoupled from the cavity using a PC. In the externally gated scheme (schematically shown in FIG. 5A), light is passively out-coupled each round trip through a transmissive mirror. The spatially displaced images have a relative time delay $\Delta t = 8fn/c$ based on their number of round trips n, and an external gate is simultaneously applied to all delayed images to create temporally distinct frames. A step function gate V(t) allows lifetime measurement from the ratios of the time-delayed bins, similar to the two-bin case described above. Using the two-bin PC scheme as the external gate gives four image frames from each round trip output (FIG. 5C). Photon efficiency, the ratio of detected photons to the number input to the cavity, with end-mirror reflectivity r is given by $1-r^n$ after n round trips, ignoring intracavity loss. This efficiency can be made very high for an appropriate choice of r. For example, 87% efficiency is obtained with r=0.6 and n=4. It should be noted that the intensity variation between the different frames is caused by partial transmission after n round trips.

FIGS. 5C-D demonstrate the output from an externally gated tilted mirror cavity. Here a Gaussian gate pulse of width less than the round trip time is used. Lifetime in FIG. 5D is calculated from the ratio R of two frames (FIG. 5B images (row i, column 4) and (row ii, column 4)) in the gated channel delayed by one cavity round trip time $t_{rt}$ of 4 ns as $R = (g*fl_{t_d})/(g*fl_{t_d+t_{rt}})$. Alternatively, both gated and ungated frames could be included in the estimation to make use of all photons as in equation (1).

In a second gated cavity scheme, there is instead no transmissive mirror, and all input light is simultaneously outcoupled from the cavity with an intracavity Pockels cell and polarizing beamsplitter. More specifically this configuration may have the pockels cell 506 inside the cavity between elements 502 and 504 with a polarizing beamsplitter element also between 502 and 504 for out-coupling. Such a scheme directly gives n images with sequential exposures of $t_{rt} = 8f/c$ and leaves no light in the cavity. Either a thin-crystal or compensated PC would be preferable for intracavity gating since the light passes through the PC each round trip. It is interesting to compare n-bin and two-bin lifetime methods in terms of their theoretical estimation accuracy (see FIGS. 6A-B). While the overall accuracies may be closely matched for monoexponentials, n-bin methods have the advantage of a wider temporal dynamic range.

These cavity imaging methods have the advantage of zero dead-time between frames and have no inherent limits on collection efficiency beyond intracavity loss. The externally gated cavity is straightforward to implement with thick-crystal PCs, but has the disadvantage of indirect temporal gating. Intracavity gating instead allows for true n-frame ultrafast imaging where each round trip corresponds to one temporally distinct image frame. Round trip times from 1 to 10 ns may be achieved with standard optics. We note that an alternative approach to n-bin imaging could similarly use multiple two-bin gates in series (e.g., as on FIG. 8D) with the added complexity of multiple PCs and detectors.

B2g) Theoretical Estimation Accuracy

Figure 6A:
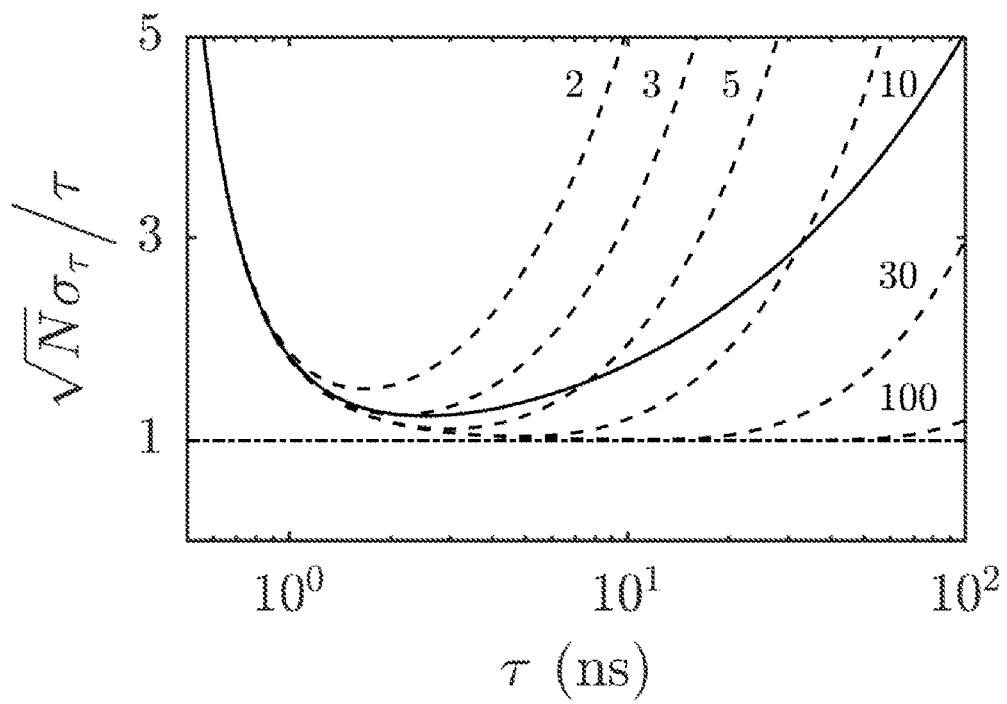
FIGS. 6A-B provide calculated results on lifetime estimation error.
Figure 6B:
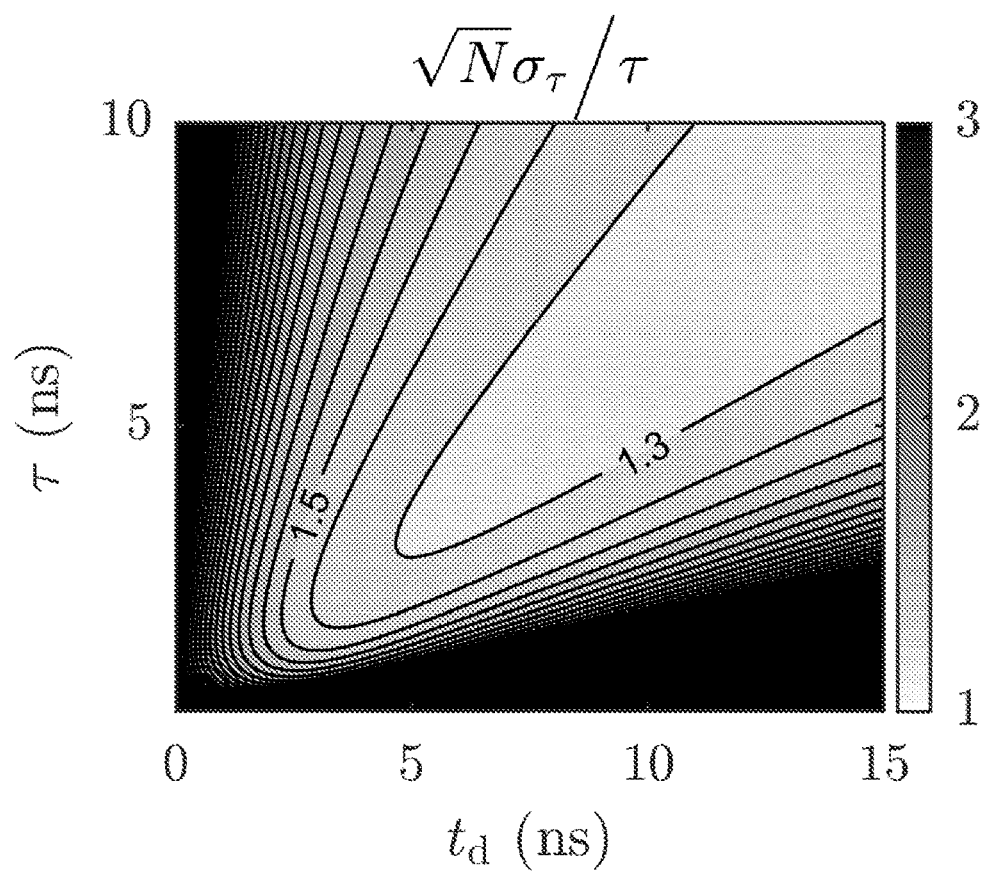

FIGS. 6A-B relate to lifetime estimation error. FIG. 6A shows the Cramer-Rao bound on lifetime estimation accuracy for a monoexponential fluorescence decay using different numbers of bins. Dashed lines compare two to n-bin lifetime measurements in the case where the measurement window is n×4 ns. The solid line corresponds to two-bin lifetime estimation at 4 ns $t_d$ without finite measurement window (i.e. ideal step function gate). Note that the range of maximum sensitivity can be shifted with $t_d$. The dash-dotted horizontal line indicates the shot noise limit: $\sigma_\tau/\tau = 1/\sqrt{N}$. FIG. 6B shows simulated lifetime resolution for a realistic two-bin PC experiment with a 1 ns 10-90% logistic rise time PC gate and 1 ns $\sigma_e$, similar to the solid line case in FIG. 6A. Near shot noise limited estimation accuracy may be obtained for $\tau$>PC rise time.

Two-bin lifetime estimation can perform surprisingly well when compared to the Cramer-Rao bound for n-bin TC-SPC. Both two-bin and n-bin estimation accuracy scale with photon counting shot noise. FIGS. 6A-B show that n-bin measurements have a wider dynamic range of lifetime sensitivity, but that a two-bin PC gate can be nearly as accurate for mono-exponential decays when tuned to the appropriate gate delay. TC-SPC gains a large number of temporal bins from the bit depth of the ADC, which dominantly affects the dynamic range. With ideal PC gating, estimation within a factor of two of the shot noise limit (SNL) may be obtained over a decade of lifetimes with peak sensitivity ~1.3×SNL. In fact, for a step function gate with 1 ns PC rise time, estimation within 2-3×SNL can be obtained between 1 and 10 ns.

B2h) Spectral Dependence of PC Gating Efficiency

Figure 7A:
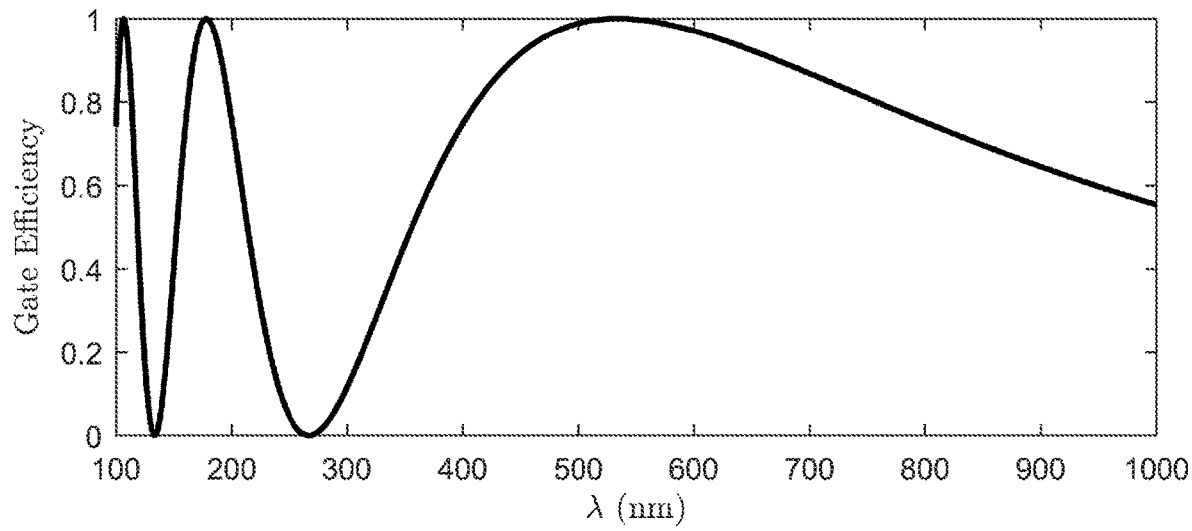
FIG. 7A shows an example of wavelength dependence of gate efficiency.
Figure 7B:
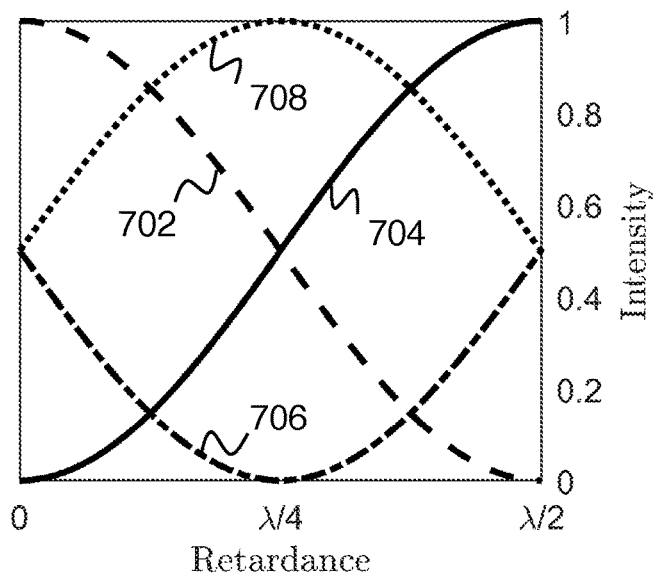
FIG. 7B shows an example of the result of adding a quarter wave plate to a modulator configuration.

FIG. 7A shows calculated spectral dependence of PC gating efficiency with $V_\pi$ set for 532 nm. High efficiency gating is shown over a 100 nm wavelength range compatible with fluorescence emission spectra. FIG. 7B shows intensity of output image channels as a function of PC retardance. In the case shown in FIG. 1A, crossed polarizers result in pairs of output frames whose intensities follow lines 702 and 704. If a quarter waveplate (QWP) is inserted at one of the outputs of the PC before the second PBS, then two of the channels can instead follow lines 706 and 708. This has the effect of introducing an optical phase shift between output images when using a sinusoidal modulation. Addition of a quarter waveplate in front of or directly after the optical modulator also has the effect of shifting the range of modulation necessary for full switching, halving the required amplitude for resonant sinusoidal drives modulating between 0 and pi phase shifts. We also note that the QWP outputs are spectrally sensitive near 532 nm, where the gating efficiency in FIG. 7A is insensitive. This could potentially be exploited for multi-dimensional measurements of spectrum and lifetime.

B3) Discussion

We have presented methods for two and n-bin temporal imaging on nanosecond timescales using Pockels cells. Proof-of-concept experiments with single molecule lifetime spectroscopy and wide-field FLIM demonstrate the potential to bring nanosecond resolution to signal-limited applications. Our approach is photon efficient and retains the sensitivity and image quality of scientific cameras, making it widely compatible and potentially inexpensive. The ability to perform single-frame FLIM without gating loss is a particularly unique advantage, as it enables dynamic FLIM without the loss, noise, and potential motion and intensity artifacts of other approaches. Replacing point-scanning FLIM with efficient wide-field acquisition may prove especially useful in bio-imaging applications such as lifetime FRET, single-molecule and super-resolution microscopy, multi-modal imaging, and clinical diagnostics. Further applications may be found in ultrafast imaging, time-to-space multiplexing, lock-in detection, and time-of-flight techniques.

For FLIM applications, nanosecond imaging with PCs enables large improvements in throughput over conventional TC-SPC. Even at low repetition rates, PC FLIM throughput readily surpasses TC-SPC. For example, a PC gated image at a low signal level of 1 photon/pixel/pulse at 15 kHz for a 1 megapixel image would take 7,500 times longer to acquire on a 20 MHz confocal TC-SPC system operating at a 10% count rate (standard to avoid pile-up). This throughput advantage grows linearly with signal and pixel number. Note that PCs may gate 1 photon/pixel/pulse without saturation, unlike GOIs or TC-SPC detectors. Wide-field, high throughput lifetime imaging with PCs could enable imaging of biological dynamics at high frame rate. An example of a relevant application would be real-time imaging of cellular signaling, especially in neurons. FLIM may also be applied as a clinical or in vivo diagnostic and wide-field gating may be readily compatible with endoscopic probes.

PC imaging overcomes the limitations of other wide-field technologies. Gated optical intensifiers in particular face technical drawbacks including low photocathode quantum efficiency, reduced resolution, multiplicative noise, and saturation. Further, the loss of ungated photons (collecting l/n for n temporal bins) necessitates multi-exposure FLIM acquisition. We note that frequency modulated cameras have recently been developed to enable high-throughput FLIM, but these suffer from very high dark currents and read noise. PC modulation provides an alternative approach to frequency domain FLIM which can also allow MHz excitation rates.

PC gating may further allow for new microscopy techniques by exploiting the nanosecond temporal dimension. For example, spectral information has been used to enable multi-labelling of biological samples, which proves important in understanding complex intracellular interactions. Fluorescence lifetime may similarly provide an attractive temporal approach for unmixing multi-labeled signals. Confocal FLIM has already been applied to this problem. In studying single molecules, the capability to combine parallel lifetime measurements with spatial and spectral channels could allow for new types of high-throughput spectroscopy experiments to study molecular populations and photophysical states. New information from lifetime could also be used to enhance spatial localization in super-resolution microscopy. Further, temporal gating could be used to suppress background autofluorescence occurring at short lifetimes.

While we have primarily focused on applications in fluorescence microscopy, we also note that PC nanosecond imaging techniques could be more broadly applied in quantum optics for fast gating, lock-in detection, event selection, or multi-pass microscopy. Other useful operation modes may be realized with the two-bin PC scheme by applying different modulations V (t). Traditional fast-imaging applications in plasma physics, laser-induced breakdown spectroscopy, combustion, time-of-flight techniques, and fluid dynamics could also benefit from sensitive single-shot imaging. The n-frame tilted mirror re-imaging cavity is particularly unique in its ability to perform single-shot ultrafast imaging of weak, non-repetitive events with zero deadtime between frames when using an internal PC gate. It could also prove useful for wide dynamic range lifetime imaging.

In summary, wide-field PC FLIM was demonstrated in single-frame and time trace modalities. Single-molecule lifetime spectroscopy showed compatibility with signal limited applications. By using a thin PC crystal, the technique was extended to ultra wide-field FLIM with single frame acquisition. FLIM images were acquired on a standard biological benchmark with exposure times down to 2 ms and acquisition speeds to the camera frame rate. Finally, a new method using re-imaging cavities to enable ultrafast imaging by time-to-space multiplexing was shown. These techniques promise to open the nanosecond regime to signal-limited applications like wide-field and single-molecule fluorescence microscopy. Further, they are broadly compatible with any imaging system and sensor, giving potential applications in a variety of fields.

B4) Methods

B4a) Experimental Setup

FLIM was performed with a homemade fluorescence microscope and a thick, commercial PC crystal for FIGS. 2A-C, 3A-C, and 5A-D. A Nikon PlanApo 100× VC 1.4 NA oil-immersion objective was used for single-molecule microscopy. All other data was taken with a 20×, 0.8 NA Zeiss PlanApo objective. Excitation pulses (1 ns FWHM) at 532 nm were generated by a Q-switched Nd:YAG at 5 kHz repetition (15 kHz for single-molecule data) (Standa Q10-SH). The detector was a machine vision CMOS camera (FLIR BFS-U3-32S4M-C). A 10 mm aperture, 40 mm thick dual crystal longitudinal KD*P PC embedded in a 50Ω transmission line was used (Lasermetrics 1072). This PC uses two crystals (rotated 90 degrees and with opposite electric fields), halving the required half-wave voltage. This design gave a comparable acceptance angle to a single-crystal PC of similar thickness ($\alpha$~4 mrad). We note that in theory this configuration can achieve some degree of off-axis cancellation with well-matched crystals. High voltage gating pulses were generated into 50Ω with an amplitude of 1.3 kV, 2.8 ns FWHM (FID GmbH) attaining 85% of $V_\pi$ and $\sigma_{IRF}$=1.1 ns. Laser and HV pulser were synchronized with a DG 535 delay generator (Stanford Research Systems). Timing jitter was <100 ps. Long transmission lines were used to prevent spurious pulse reflections during fluorescence decay. For single-molecule data, only two of the output frames (one output from first PBS) were used to maximize FOV through the PC, limiting photon efficiency to ~50%. This is not a fundamental limitation of the technique but was used to simplify our implementation with a limited single PC aperture. IRFs were acquired using a frosted glass sample.

The thin PC crystal demonstration in FIGS. 4A-C was performed on an inverted microscope (Zeiss Axiovert) using a 20×, 0.8 NA Zeiss PlanApo objective and Andor Neo5.5 sCMOS. A 3 mm thick, 20 mm aperture KD*P longitudinal PC was home-built along with a high voltage driver capable of supplying nanosecond switching pulses with amplitudes up to 5 kV. A gating efficiency of 0.8 is used with a rise time of 4.5 ns for the data in FIGS. 4A-C. Only one polarization channel is demonstrated here. Both channels may be incorporated by adding a second PC or Wollaston prism.

The 4f re-imaging cavity used for the n-bin demonstration used a 3 mm prism mirror (Thorlabs MRA03-G01) for in-coupling and f=150 mm ($t_{rt}$=8f/c=4.0 ns). Passive out-coupling was through a neutral density filter of optical density 1 (R=0.4 and T=0.1). Relay lenses were used to create an image plane at the PC and again at the camera (CMOS). Pick-off mirrors combined imaging beams generated by the two PBS with equal path lengths.

B4b) Sample Preparation

Alexa 532 (Invitrogen, Thermo Fisher) single-molecule samples were prepared by drop casting dilute solution onto a hydrophobic substrate, then placing and removing a pristine coverslip. A dense field was photobleached to the point that single, diffraction-limited emitters were observed. Step-like photobleaching was observed along with blink-on dynamics. While multi-molecule emission within a diffraction limited spot was certainly also seen, a majority of the emitters were single molecules. Fluorescence bead samples were drop cast onto coverglass from solutions of orange (100 nm), red (1 µm), nile red (2 µm), infrared (100 nm) (Invitrogen, Thermo Fisher) and propidium iodide (10 µm) (Bangs Laboratories, Inc.) beads. The IR bead solution formed crystals as seen in FIGS. 2B-C.

B4c) Data Analysis

Lifetimes were computed by both ratiometric calculation from image intensities and by time-trace fitting. In ratiometric calculation, a numerically generated lookup table is used to convert between the measured ratio and estimated lifetime according to the equations in the text and the pre-characterized IRF. Due to our specific $t_d$ and Gaussian gate pulse in FIGS. 3A-C, lifetimes below 1.1 ns are redundant with those above 1.1 ns in the numerical conversion. We report the larger lifetime value. In timing trace calculation, fitting by least squares was used to estimate lifetime. The PC applies a time-varying retardance to linearly polarized input as $\delta=2\pi r_{63} V n_o^3/\lambda$, where the birefringent phase shift $\delta$ is determined by the applied voltage V, ordinary index of refraction $n_o$, and the longitudinal electro-optic coefficient $r_{63}$. Transmission in the parallel and perpendicular beamsplitter channels is $T_s=\sin^2(\delta/2)$ and $T_p=\cos^2(\delta/2)$. Lifetime calculations account for the imperfect gating efficiency of the Pockels cell as captured in the IRF. In FIGS. 2A-C, 3A-C, and 5A-D, a constant IRF is assumed across a conservative FOV. This may cause position-dependent lifetime errors. In FIGS. 4A-C, spatial variation is more apparent due to large FOV and is included in lifetime calculations. A beamsplitter in the microscope filter slider allows rapid switching between fluorescence and frosted glass IRF calibration. IRF calibration may also be performed with a short lifetime dye.

Single-molecule gated and ungated intensities were determined by summing $N_p$ pixels corresponding to each molecule region of interest after background subtraction. Error bars in FIG. 3C account for shot noise in the gated (G) and ungated (U) frames and for the background standard deviations $\sigma_G$ and $\sigma_U$ in the ratio SE $\sigma_R$ as $$\sigma_R = \frac{G}{U}\sqrt{\frac{1}{G}+\frac{1}{U}+N_p\left(\frac{\sigma_G^2}{G^2}+\frac{\sigma_U^2}{U^2}\right)}.$$

Background is the dominant error term here combining background signal with a high camera dark current. Lifetime estimation accuracy for an ideal two-bin PC gate is given by $$\frac{\sqrt{N}\sigma_\tau}{\tau} = \frac{\tau}{\tau_d}\sqrt{e^{\tau_d/\tau}-1}.$$

The Cramér-Rao bound for n-bin lifetime estimation in a fixed time window of width T may be directly calculated from a multinomial probability distribution. Fixed window bounds in FIGS. 6A-B were found by setting $T=nxt_{rt}$ for n round trips. In the large n limit, these bounds demonstrate the performance of TC-SPC. The photon normalized Cramer-Rao bound for n bins is $$\frac{\sqrt{N}\sigma_\tau}{\tau} = \frac{n\tau}{\tau}\sqrt{1-e^{-T/\tau}}\left[\frac{e^{\frac{T}{n\tau}}(1-e^{-T/\tau})}{(e^{\frac{T}{n\tau}}-1)^2} - \frac{n^2}{e^{T/\tau}-1}\right]^{-1/2}.$$

C) Further Variations

C1) Modulator Configurations

Figure 8A:
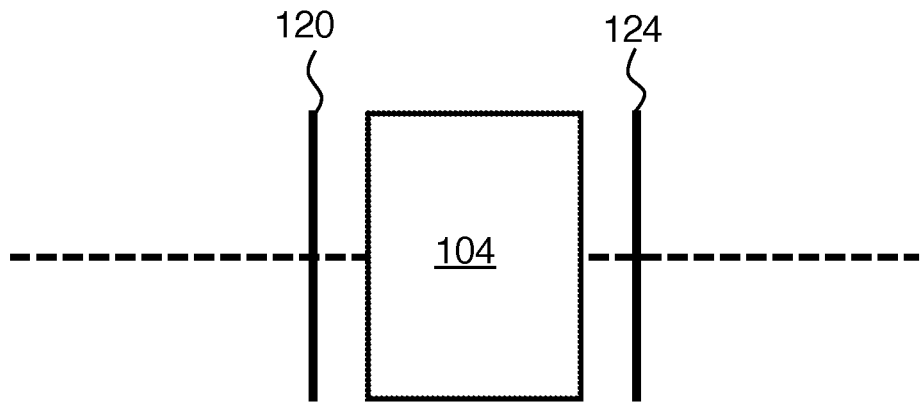
FIGS. 8A-E show various modulator configurations.
Figure 8B:
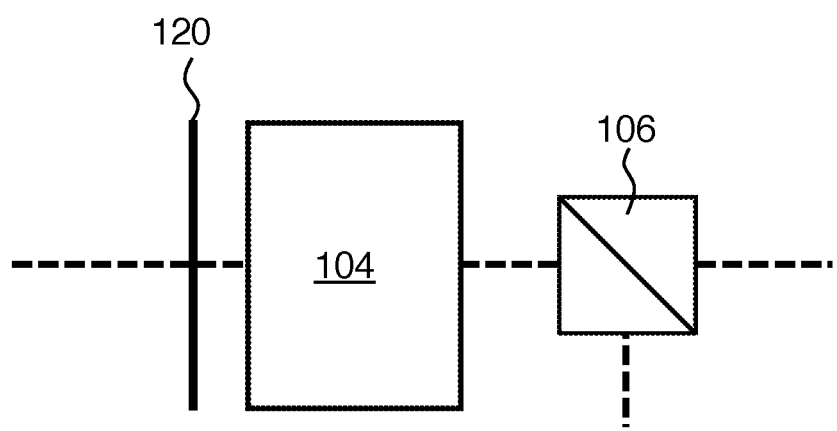
Figure 8C:
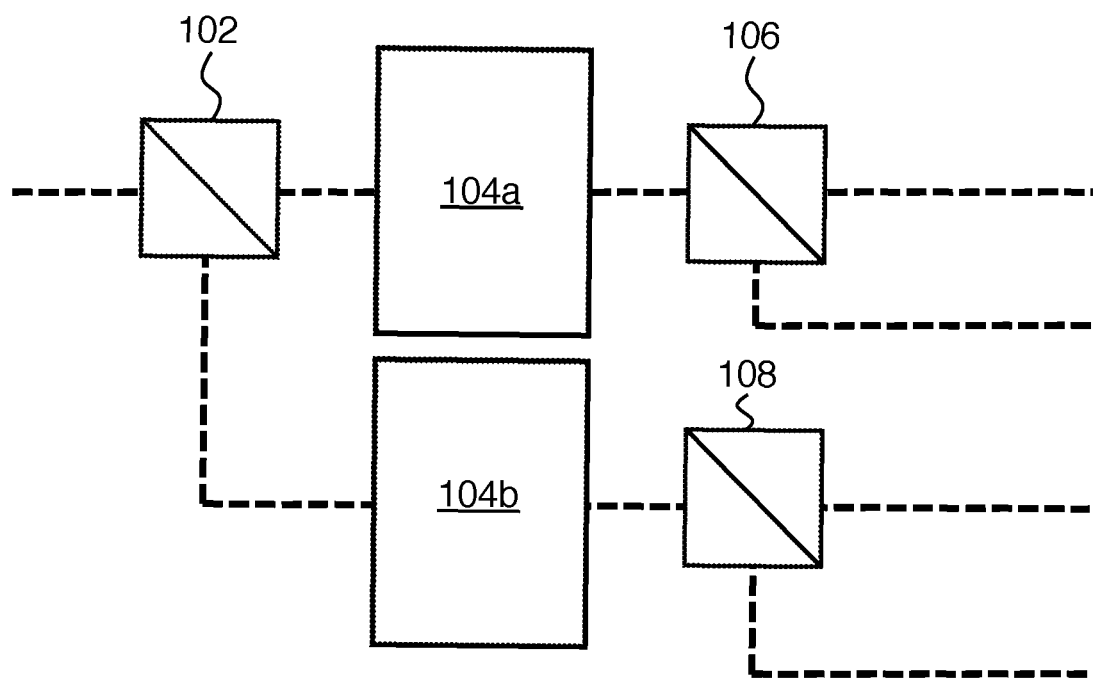

As indicated above, various optical modulator configurations are possible in addition to the example of FIG. 1A. Here FIG. 8A shows a polarization modulator 104 disposed between polarizers 120 and 124. FIG. 8B shows polarization modulator 104 disposed between an input polarizer 120 and an output PBS 106. FIG. 8C is similar to the example of FIG. 1A, except that two polarization modulators 104a, 104b are employed. In this case, the drive signals applied to the two modulators 104a, 104b can be the same or they can be different.

These modulator configurations may also include double-pass variations where there is a mirror after the polarization modulator (in FIG. 8C for example after modulator 104a and/or 104b) to reflect the light back through the same modulator(s). The beam-splitter before the modulator (102) may then split the reflected, modulated light from the incident light and direct it to a detector array. This has the advantage of requiring half the voltage for a given modulator phase shift. A disadvantage is that double-pass does not easily allow both output channels simultaneously.

Figure 8D:
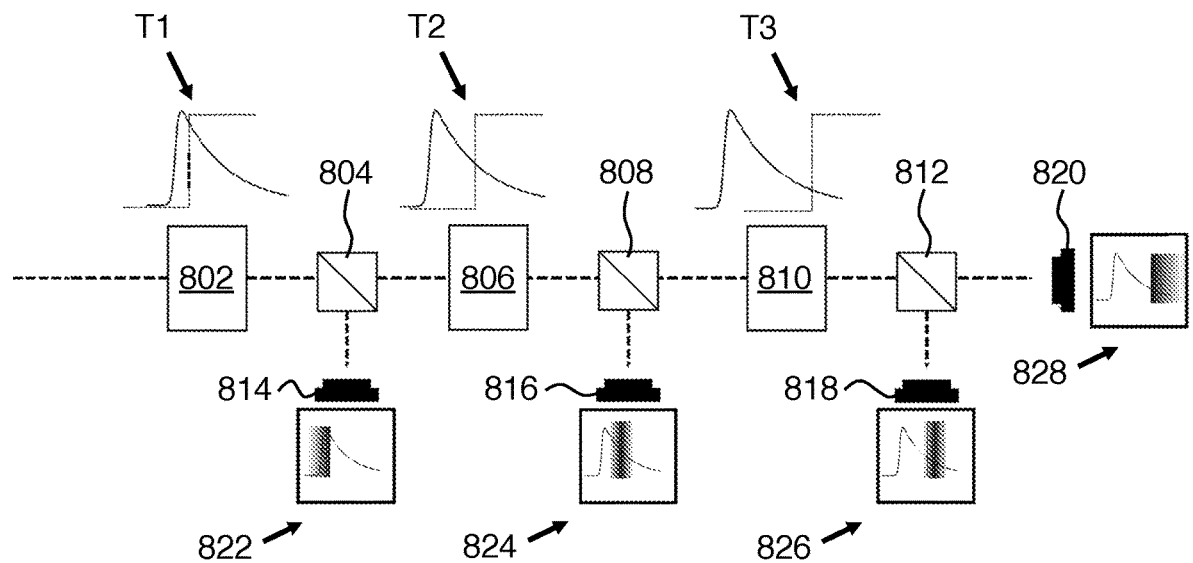

The example of FIG. 8D shows a series arrangement of optical modulators used to provide n-bin imaging. Here modulator 802, PBS 804, modulator 806, PBS 808, modulator 810 and PBS are arranged in series as shown. Gating inputs to modulators 802, 806, 810 are step functions at T1, T2, T3, respectively, as shown. The result is that cameras 814, 816, 818, 820 get time bins 822, 824, 826, 828, respectively. This example provides 4 time bins, but any number of outputs can be provided in such an arrangement, and any modulation waveform may be applied.

Figure 8E:
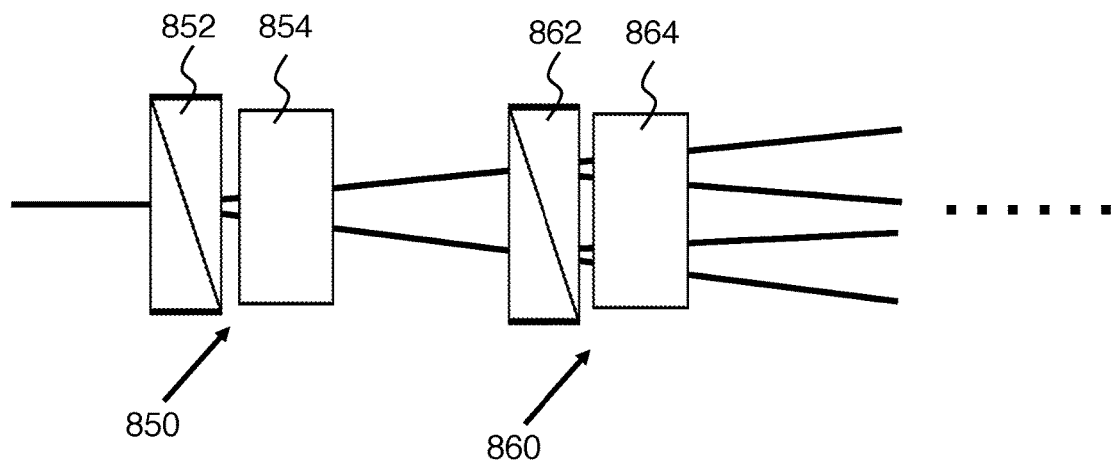

FIG. 8E shows another example of a series arrangement of optical modulators. Here first subsystem 850 include a PBS 852 and a modulator 854 and second subsystem 860 includes a PBS 862 and a modulator 864. The individual modulators in such series arrangements can be any of the above-described modulator configurations, in any combination. Each polarization modulator in the series for example may receive N input images, apply any modulation, and then generate 2N image outputs following a beamsplitter. One application would be improving temporal dynamic range of a system by having fast and slow modulation waveforms applied on sequential modulators.

C2) Hyperspectral Configurations

Figure 9A:
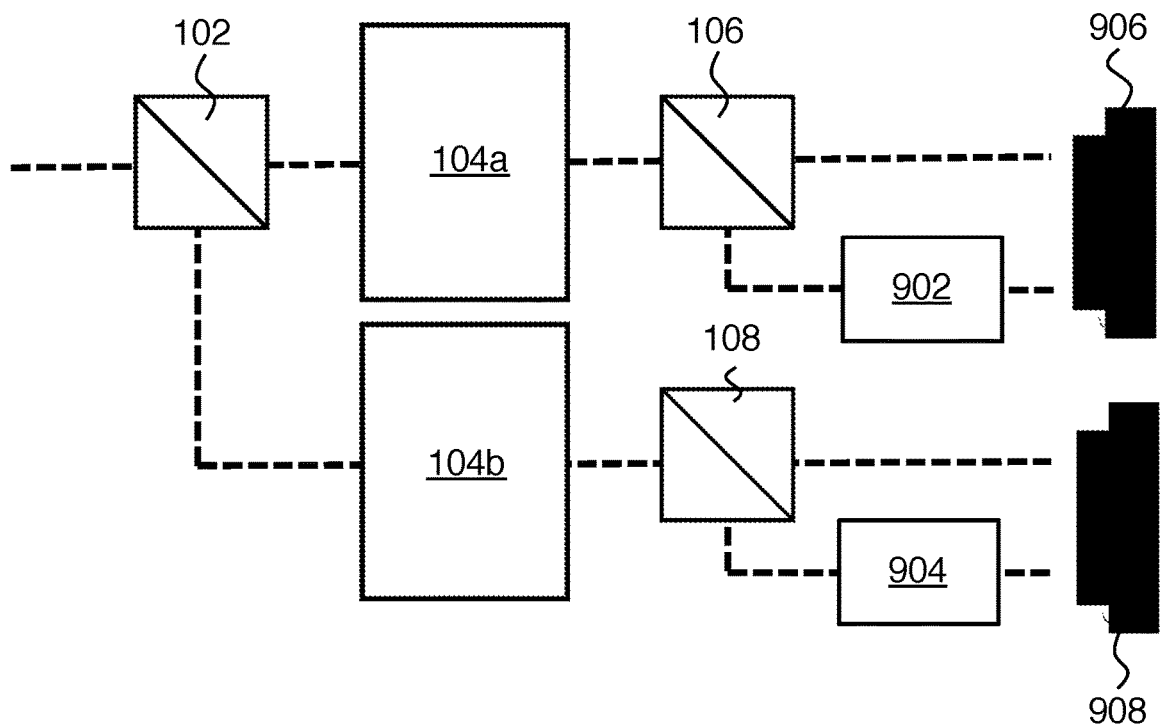
FIGS. 9A-B show exemplary time-resolved hyperspectral configurations.
Figure 9B:
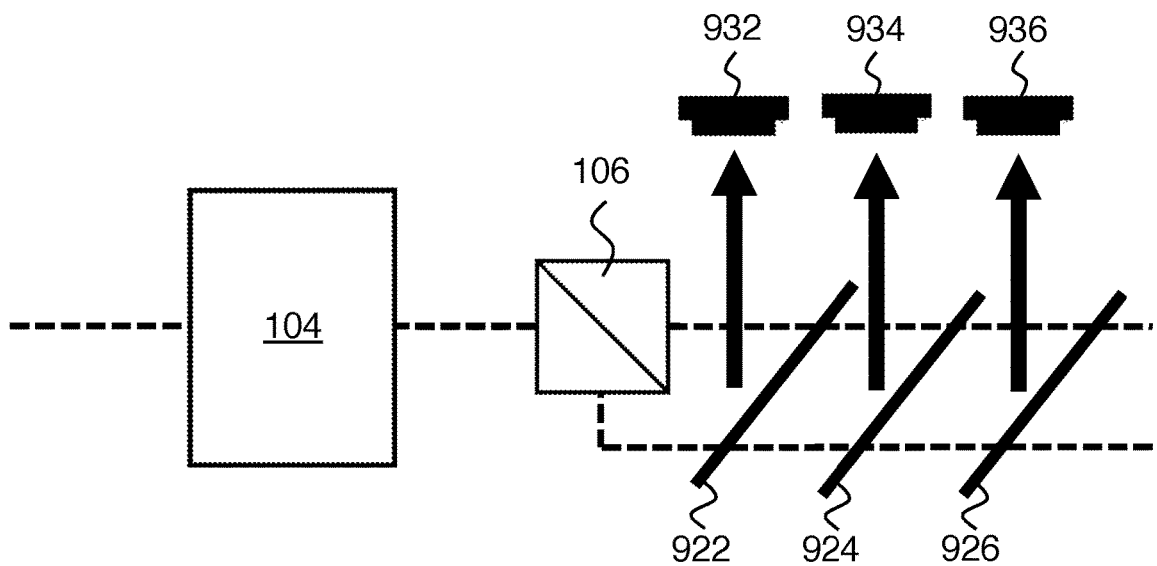

The example of FIG. 9A is similar to the example of FIG. 8C, except that wavelength separating elements 902 and 904 (e.g. prism, grating) are added, and cameras 906, 908 are now explicitly shown. The example of FIG. 9B shows wavelength splitting elements 922, 924, 926 (e.g., dichroic mirrors coupling the optical outputs to any number of cameras 932, 934, 936. Such added dispersive elements can be provided at some or all outputs of the modulator. This can provide simultaneous measurement of space, nanosecond time, polarization, and color for a wide-field image. Such time-resolved hyperspectral imaging is especially valuable for single-molecule fluorescence microscopy.

Optical modulators may be combined with wavelength-resolved elements to realize multi-dimensional or 'hyper-spectral' modes of imaging in wide-field (FIGS. 9A-B). In a fluorescence microscope having a pulsed excitation, for example, each emitted photon has the following degrees of freedom: time emitted, polarization, spatial coordinates, and wavelength. By combining all-optical modulation based on polarization with wavelength-selective optics, all of these parameters may be measured simultaneously on a slow array detector.

In single-molecule spectroscopy and localization microscopy where the scene consists of sparse single-point emitters, a dispersive element like a prism, a diffraction grating, or a wedged filter stack may be inserted into output paths of the optical modulator. This allows for spectral information to be encoded as a linear streak or array of emitter images. Similarly, wavelength splitting elements like dichroic mirrors may be used to split the output light into an array of color channels. This splitting method is compatible with wide-field images and not restricted to sparse scenes. Absorptive color filters and sensor array filters such as Bayer filters may also be employed. Multi-dimensional techniques allow for increased precision in measurements of Forster resonance energy transfer (FRET) between fluorophores by combining wavelength and lifetime channels. They also allow higher-dimensional imaging that can differentiate more individual fluorescent labels within a biological specimen.

C3) Resonant/Lock-in Operation

Figure 10A:
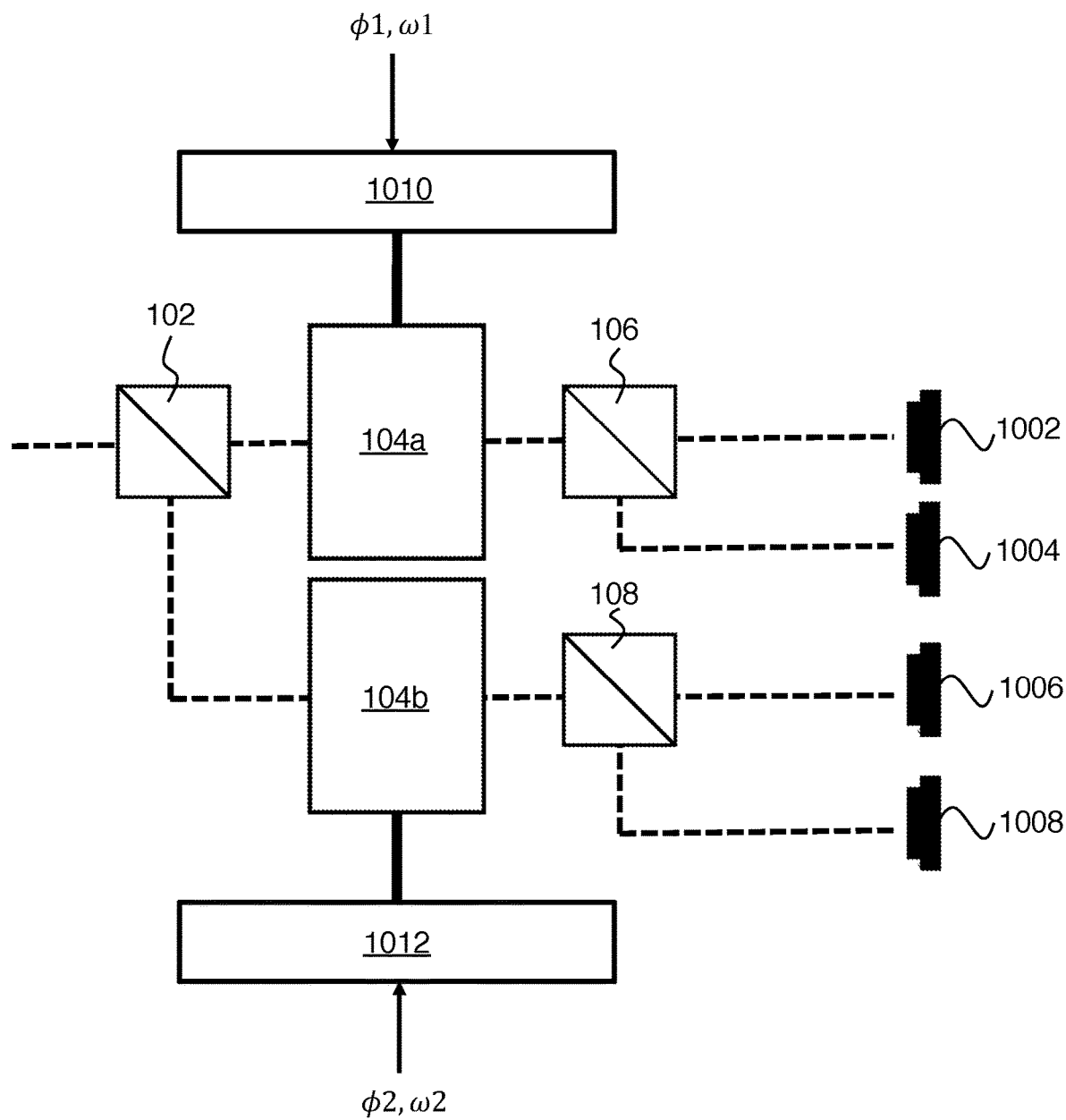
FIGS. 10A-B show a lock-in configuration.

FIG. 10A shows an exemplary configuration for resonant/lock-in signal processing with this approach. Here the optical configuration is as on FIG. 8C. Modulator 104a is driven by drive electronics 1010 at a first signal ($\phi1$, $\omega1$). Modulator 104b is driven by drive electronics 1020 at a second signal ($\phi2$, $\omega2$). The resulting image at camera 1002 is at the first signal, and the image at camera 1004 is out of phase with camera 1002. Similarly, the resulting image at camera 1006 is at the second signal, and the image at camera 1008 is out of phase with camera 1006.

Figure 10B:
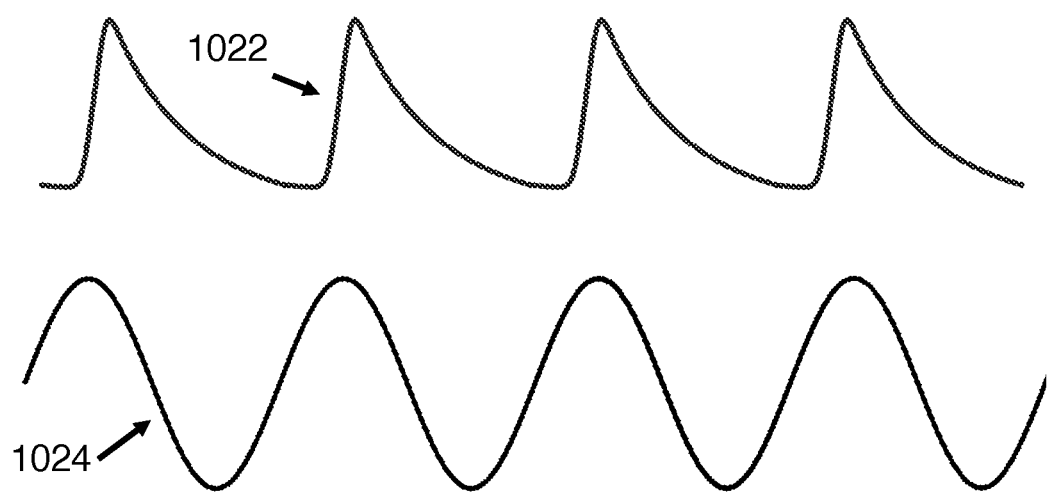

FIG. 10B shows two examples of incident waveforms for lock-in signal processing: a sequence of fluorescence decays 1022 and a sinusoid 1024. More general periodic input waveform shapes are also possible. Modulation is applied to PC to demodulate fast varying waveform onto slow detector arrays to estimate shape parameters. This configuration can be regarded as a lock-in camera allowing de-modulation and full vector measurement on a slow bandwidth detector by using two modulation phases.

Sinusoidal modulation enables estimation of waveform shape parameters in the frequency domain. Our technique can implement either homodyne or heterodyne detection for wide-field images on standard camera sensors. An example is shown in FIGS. 10A-B. A polarizing beam splitter (e.g., 106, 108) after a polarization modulator (e.g., 104a, 104b) generates two intensity images. One of these corresponds to the convolution of the incident intensity waveform with the modulation. The second corresponds to the convolution of the incident intensity waveform with the inverse of the modulation. For a sinusoidal modulation, this means that the two outputs have modulation phase shifted by 180 degrees. Just as for time-gated waveform estimation, a significant advantage of our approach is the simultaneous acquisition of gated and ungated images. Here this means 0 and 180 degree phase images. This allows normalization of incident light intensity and high speed, single-frame acquisition.

Frequency domain fluorescence lifetime estimation by homodyne is a well-known technique. Current wide-field approaches use either gated optical intensifiers or on-chip multi-tap modulated camera sensors to image in the frequency domain. These have significant disadvantages in efficiency, cost, and speed. Our approach instead allows for all-optical demodulation of the fluorescent lifetime signal.

When a frequency modulated excitation is applied to a fluorescent scene, the fluorescence response can be characterized by its phase shift relative to the excitation and its modulation depth. Mathematically this is usually described in terms of the sine and cosine Fourier transforms, $G(\omega)$ and $S(\omega)$ respectively, of the received light intensity. G and S are related to phase $\theta$ and modulation depth M of the response in the following equations. They are often combined to allow phasor plot analysis of fluorescence decays.

$$\theta = \tan^{-1}\frac{S}{G}$$
$$M = \sqrt{S^2 + G^2}$$

Our techniques may produce a number of intensity outputs having a defined modulation phase and frequency. FIG. 10A shows four outputs (to cameras 1002, 1004, 1006, 1008), two from each single PC modulator shifted 180 degrees. If a mono-exponential decay is assumed and the response light phase shift is pre-calibrated then only a single exposure from one modulator having two phases of 0 and 180 degrees on the detector is required ($I_{0,\omega1}$ and $I_{180,\omega1}$). This provides a modulation depth estimate for lifetime.

$$M = \sqrt{\frac{I_{\phi1,\omega1} - I_{\phi1+180,\omega1}}{2(I_{\phi1,\omega1} + I_{\phi1+180,\omega1})}} \quad \text{(single frame measurement)}$$

Phase of the response may similarly be measured by fitting multiple discrete samples with each having a different modulator drive phase in analogy to time-domain delay traces. A separate possibility is the use of multiple modulations each having a different drive phase. This allows estimation of phase directly from four intensity outputs, for example $$\theta = \tan^{-1}\left(\frac{I_{0,\omega1} - I_{180,\omega1}}{I_{270,\omega1} - I_{90,\omega1}}\right),$$

and more generally full vector measurements of a periodic signal.

The phase and modulation depth provide two separate lifetime estimators below. Both may be compared, e.g. in phasor plots, to better estimate multi-exponential lifetimes. Frequency domain estimation may approach the same photon sensitivity limits as time-domain estimation.

$$\tau_{phase} = \frac{1}{\omega}\tan\theta \quad \tau_{modulation} = \frac{1}{\omega}\sqrt{\frac{1}{M^2} - 1}$$

Frequency domain operation realizes an imaging lock-in detector where every pixel of the imaging array detector is performing a separate lock-in or demodulation process analogous to a single lock-in amplifier. Two phase shifts may be combined to make a full measurement of a complex phasor acquiring both the in-phase and quadrature components. This may be easily accomplished simultaneously by either having two modulators driven with different phases or by optically introducing a phase shift to some of the imaging beams using a retarder or waveplate.

Another possibility is the use of modulation frequency slightly different from the illumination input to perform heterodyne detection. Slow beat frequencies may be detected on a slow camera chip for example. Similarly, series modulators could be driven with different drive frequencies or incommensurate phases.

In addition to the unique requirements of Pockels cells being suited for wide-field imaging, high frequency operation presents its own challenges.

1) A high voltage AC voltage may need to be applied to the crystal. An ideal method for driving the PC is thus incorporating it into a resonant electronic circuit like an LC tank circuit where it acts as a capacitor. This circuit should have a high Q-factor to enable practical drive electronics.

2) Heating of the Pockels cell crystal due to dielectric losses or of the Pockels cell electrodes due to resistive loss may require measures for active cooling. The crystal may be actively cooled by mounting it onto a cooled plate or by cooling its metal electrodes (e.g. in transverse field modulator geometries), by immersion in a dielectric coolant (flowing or for static heat conduction), or by sandwiching a longitudinal modulator between heat conductive but optically transparent plates. Such plates could be made of glass, transparent ceramics, or sapphire for example and could connect to a heat-sink or thermal control unit.

C4) Charged Particle Detection

Figure 11A:
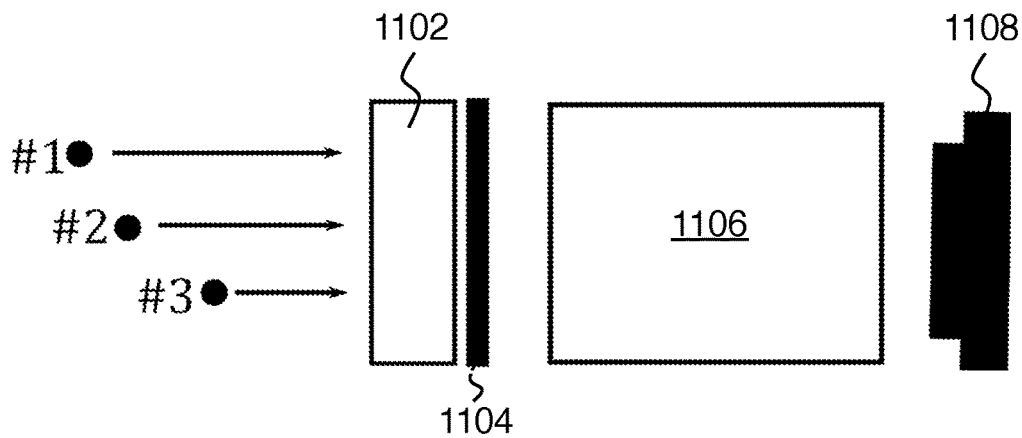
FIGS. 11A-C show an application to charged particle detection.
Figure 11B:
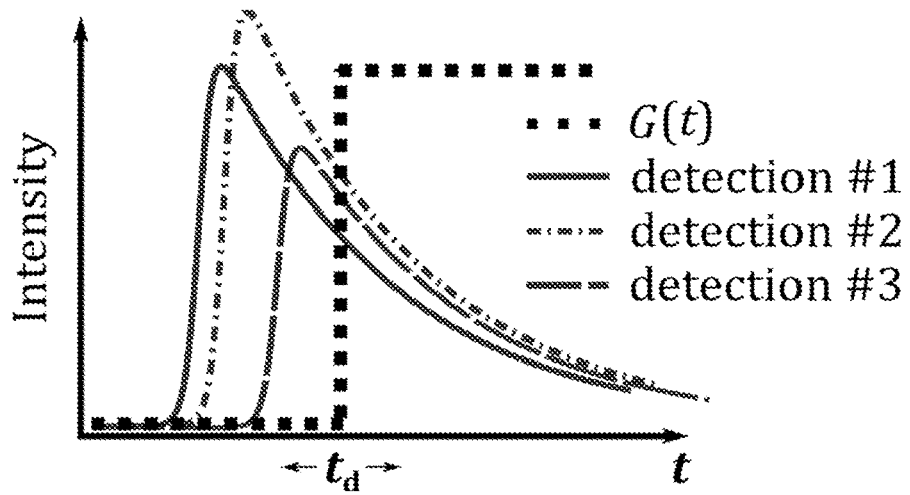
Figure 11C:
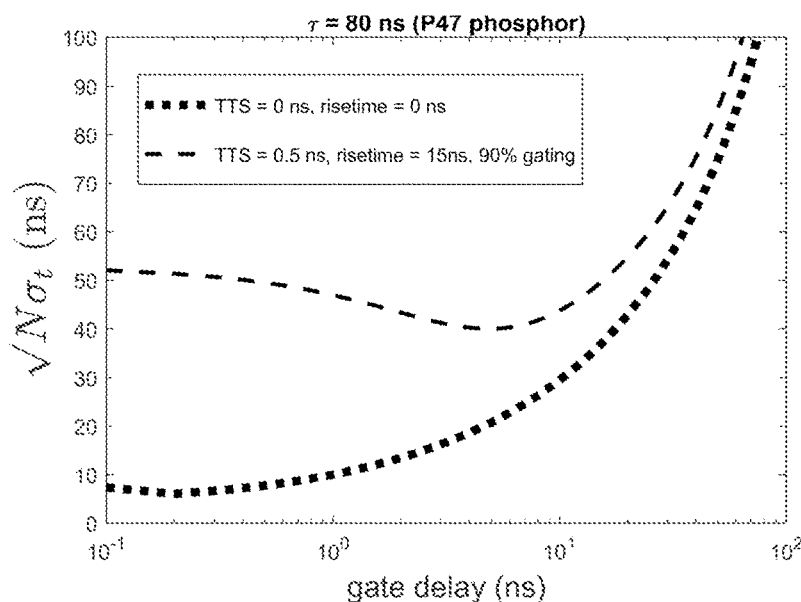

FIGS. 11A-C shows application of this work to charged particle detectors. These particle detectors (e.g., electron cameras) often convert particle flux to a highly non-linear optical response by using a phosphorescent screen or a scintillating crystal. The resultant "fluorescence" decay waveform shape can be measured by our method in order to provide temporal information about when a charged particle hits the detector by fitting a known lifetime. This allows for time-correlated charged particle counting in a wide-field image with 10's-1000's of simultaneous, spatially-resolved hits. This capability does not exist with current detectors and will allow new types of measurements in electron microscopy.

FIG. 11A schematically shows three particles (#1, #2, #3) hitting a phosphor or scintillator 1104 at different positions and times. Here 1102 is an optional multiplier or intensifier, 1106 is an optical modulator unit as described above, and 1108 is the camera. The differing times are schematically shown on FIG. 11B. Phosphor/scintillator 1104 generates a burst of light having a long decay (80 ns for P47) and large photon number (10^6 for microchannel plate multipliers). The plot of FIG. 11C assumes some transit time spread (TTS) for a multiplier stage and an 80 nanosecond decay constant, and plots time estimation accuracy for an ideal step gate and a step gate having a long rise-time and 90% efficiency. Given large photon number N for microchannel plate+phosphor, this enables sub-100 picosecond timing resolution.

Time-correlated charged particle detectors have similar limitations to time-correlated single photon counters. Existing techniques combine microchannel plate electron multipliers with one or more anodes made of crossed-wire delay lines. A particle hit produces a burst of electrons from the microchannel plate which is spatially localized on the crossed-wire anode based on pulse delay times in each line. This approach is complex and limited to only a few simultaneous particle hits and few megahertz count rates (low throughput). Our optical method provides an efficient alternative by using a scintillator or phosphor screen to produce a phosphorescence or fluorescence decay waveform from each hit (FIGS. 11A-C). In this case, the lifetime of the decay waveform is known a-priori and the fitting of the phosphorescence waveform shape can provide the time when the particle hits the screen.

For wide-field time-domain FLIM, an ideal gate can estimate lifetime with shot-noise limited accuracy as described in the following equation:

$$\sqrt{N}\,\sigma_\tau = \frac{\tau^2}{t_d}\sqrt{e^{t_d/\tau}-1}.$$

If the lifetime is instead known, then particle hit time may be similarly estimated with shot-noise limited sensitivity as $\sqrt{N}\sigma_t = \tau\sqrt{e^{t_d/\tau}-1}$. Microchannel plates at high gain may generate $>10^6$ photons per pulse, allowing very high temporal resolution in the estimation—even approaching the tens of picosecond jitter of the electron multiplier. Having access to both gated and un-gated images is critical to enable normalization for variable gain from each particle event. Typical transit time spreads of MCP detectors are approximately 300 picoseconds with pulse jitters in the 10's of picoseconds.

A time-correlated spatial detector for particles could be used in electron microscopy to record high resolution space and time information for each imaging electron. For example, it might find use in ultrafast transmission electron microscopes (UTEMS) or other electron microscopes and ultrafast diffraction experiments having pulsed or laser-triggered emission sources. Further, such a detector could allow new imaging modes for electron energy loss spectroscopy (EELS) where energy loss due to inelastic scattering in the sample results in a change in the electron's velocity and arrival time. It can similarly enable the removal of chromatic effects due to varying source energies in low-energy electron imaging systems for example low energy electron microscopes (LEEM) and photoemission electron microscopes (PEEM)). This camera may further act as a quantum detector, enabling measurement of position and momentum correlations and detection of multi-particle coincidences.

The capability to measure >10 simultaneous hits is unique to our technology, and extension to >10000 simultaneous hits is possible. Other applications include use in mass spectrometry for ion time-of-flight detection, ion momentum spectroscopy experiments (e.g. cold target recoil ion momentum spectroscopy—COLTRIMS), and even single-photon time-correlated detection using image intensifier tubes.

C5) Endoscopic Applications

Wide-field optical modulators are promising for clinical fluorescence lifetime systems. Imaging of fluorescence and tissue auto-fluorescence can provide an indicator for various disease and bio-markers. Use of endoscopic, arthroscopic, or macro imaging systems in a clinical setting as the front-end for the optical modulator can allow for improved identification of diseased tissue and surgical margins. For example, FLIM allows measurement of NADH/NAD(P)H in cells as a marker of metabolism. This can provide an optical signature for cancerous tissue. Multi-spectral FLIM combining lifetime and wavelength dimensions can also be a valuable diagnostic tool.

High speed acquisition and rapid lifetime calculation enabled by our single-frame method is especially valuable, as it allows real-time display of fluorescence lifetime images and video-rate observation during a medical procedure or operation.

Endoscopic systems may interface flexible optical fiber bundles, multi-mode optical fibers, and/or GRIN optics to the modulator unit(s). Relay lens systems may also be used such as in rigid arthroscopes.

The invention claimed is:

1. Apparatus for providing time-resolved optical imaging, the apparatus comprising:
   a wide field optical intensity modulator;
   one or more 2-D detector arrays;
   imaging optics configured to image incident light onto the one or more 2-D detector arrays through the wide field optical intensity modulator;
   wherein a temporal bandwidth of the optical modulator is greater than a temporal pixel bandwidth of the one or more 2-D detector arrays;
   a processor configured to automatically determine one or more waveform shape parameters of the incident light by analyzing signals from the one or more 2-D detector arrays vs. an input modulation applied to the optical intensity modulator;
   wherein the one or more waveform shape parameters of the incident light are determined on a pixel-by-pixel basis of the one or more 2-D detector arrays.

2. The apparatus of claim 1, wherein the wide field optical intensity modulator comprises a wide field optical polarization modulator disposed between a first polarizer and a second polarizer so as to convert polarization modulation to intensity modulation.

3. The apparatus of claim 1,
   wherein the wide field optical intensity modulator comprises an input polarizer followed by a wide field optical polarization modulator followed by a polarizing beam splitter,
   wherein the polarizing beam splitter provides a first output to a first of the 2-D detector arrays and provides a second output to a second of the 2-D detector arrays,
   whereby polarization modulation is converted to intensity modulation of the first and second outputs.

4. The apparatus of claim 3, wherein the one or more waveform shape parameters includes an exponential decay time, wherein the input modulation is a step function, and wherein the exponential decay time is determined by analysis of single-frame signals from corresponding pixels of the first 2-D detector array and the second 2-D detector array.

5. The apparatus of claim 1, wherein the wide field optical intensity modulator comprises:
   an input polarizing beam splitter having a first output and a second output;
   a wide field optical polarization modulator (PM) configured to receive the first and second outputs in parallel and to provide corresponding first and second PM outputs;
   a first output polarizing beam splitter configured to receive the first PM output and to provide a third output and a fourth output;
   a second output polarizing beam splitter configured to receive the second PM output and to provide a fifth output and a sixth output;
   wherein the third output is provided to a first of the 2-D detector arrays;
   wherein the fourth output is provided to a second of the 2-D detector arrays;
   wherein the fifth output is provided to a third of the 2-D detector arrays;
   wherein the sixth output is provided to a fourth of the 2-D detector arrays.

6. The apparatus of claim 1, wherein the input modulation is a pulse having an automatically adjustable time delay $t_d$ after an optical excitation provided to a scene, and wherein the one or more waveform shape parameters include data points of detector array signals vs. time delay.

7. The apparatus of claim 1, wherein the input modulation is selected from the group consisting of: a step function, a sampling pulse, and periodic modulation for lock-in detection.

8. The apparatus of claim 1, wherein the wide field optical intensity modulator includes a longitudinal Pockels cell having a direction of optical propagation and an applied electric field direction that coincide.

9. The apparatus of claim 1, wherein the imaging optics include a multipass optical cavity having a cavity round trip time, wherein the multipass optical cavity is configured to provide optical time resolution according to multiples of the cavity round trip time.

10. The apparatus of claim 1, wherein the incident light is a periodic signal that is responsive to a periodic excitation of a scene being viewed, and wherein the wide field optical intensity modulator is resonantly driven synchronously with respect to the periodic signal.

11. The apparatus of claim 1, wherein the optical intensity modulator includes two or more optical modulators having identical or different input modulation signals.

12. The apparatus of claim 1, wherein the imaging optics is configured to view a scene.

13. The apparatus of claim 12, wherein an optical response of the scene to an excitation provides the incident light.

14. The apparatus of claim 13, wherein the optical response of the scene is a nonlinear response.

15. The apparatus of claim 13, wherein the wide-field optical intensity modulator is driven with a modulation signal having a controllable delay after the excitation.

* * * * *